US010810620B2

(12) United States Patent
Malik

(10) Patent No.: US 10,810,620 B2
(45) Date of Patent: Oct. 20, 2020

(54) FACILITATING DYNAMIC EVENT-BASED CONTENT DISTRIBUTION

(71) Applicant: AT&T Intellectual Property I, L.P., Atlanta, GA (US)

(72) Inventor: Dale W. Malik, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 890 days.

(21) Appl. No.: 14/959,218

(22) Filed: Dec. 4, 2015

(65) Prior Publication Data

US 2017/0161784 A1  Jun. 8, 2017

(51) Int. Cl.
| | | |
|---|---|---|
| G06Q 30/02 | (2012.01) | |
| H04W 4/02 | (2018.01) | |
| H04W 4/024 | (2018.01) | |

(52) U.S. Cl.
CPC ..... *G06Q 30/0261* (2013.01); *G06Q 30/0267* (2013.01); *H04W 4/023* (2013.01); *H04W 4/024* (2018.02)

(58) Field of Classification Search
CPC .......... G06Q 30/0261; G06Q 30/0267; H04W 4/024; H04W 4/023
See application file for complete search history.

(56) References Cited

U.S. PATENT DOCUMENTS

| | | | |
|---|---|---|---|
| 7,647,037 B2 | 1/2010 | Ayachitula et al. | |
| 7,805,374 B2 | 9/2010 | Fein | |
| 8,271,413 B2 * | 9/2012 | Agarwal | ........... G06F 17/30867 706/46 |
| 8,417,258 B2 * | 4/2013 | Barnes, Jr. | ......... G06Q 10/1053 455/456.1 |

(Continued)

FOREIGN PATENT DOCUMENTS

| | | |
|---|---|---|
| WO | 2010027714 A9 | 3/2010 |
| WO | 2010032253 A3 | 3/2010 |

OTHER PUBLICATIONS

"5 types of kiosk that you should know about", Jul. 2015, http://www.lamasatech.com/5-types-kiosks-that-you-should-know-about/. Retrieved Jul. 30, 2015, 11 pages.

(Continued)

*Primary Examiner* — Colleen A Hoar
(74) *Attorney, Agent, or Firm* — Amin, Turocy & Watson, LLP

(57) ABSTRACT

Dynamic event-based content distribution is facilitated. In one embodiment, a method comprises evaluating, by a device comprising a processor and communicatively coupled to a content node device of content node devices, a criterion to select content of a plurality of content to present from the content node device to a mobile device, wherein the criterion and selected content are associated with a time-limited event, the time-limited event occurring independent of the mobile device. The method also includes selecting, by the device, a value of values for the selected content, wherein the selected value is based on first geographical information for the time-limited event and second geographical information for the mobile device. The method also includes generating, by the device, information to cause the content node device to present, to the mobile device, the selected content with the selected value, wherein the generating is based on the evaluating and the selecting.

19 Claims, 13 Drawing Sheets

(56) References Cited

U.S. PATENT DOCUMENTS

| | | | |
|---|---|---|---|
| 8,447,331 | B2 | 5/2013 | Busch |
| 8,621,504 | B2 | 12/2013 | Reynolds et al. |
| 8,924,265 | B2 | 12/2014 | Selinger et al. |
| 8,983,488 | B2 | 3/2015 | Sweeney et al. |
| 9,002,730 | B2 | 4/2015 | Postrel |
| 9,191,788 | B2 * | 11/2015 | Somekh ............... H04W 4/12 |
| 2006/0085521 | A1 | 4/2006 | Sztybel |
| 2009/0076906 | A1 | 3/2009 | Kansal et al. |
| 2009/0187463 | A1 | 7/2009 | DaCosta |
| 2012/0190386 | A1 * | 7/2012 | Anderson .............. G01C 15/04 |
| | | | 455/456.3 |
| 2013/0297420 | A1 | 11/2013 | Roberts et al. |
| 2014/0136312 | A1 | 5/2014 | Saksena et al. |
| 2014/0297363 | A1 | 10/2014 | Vemana |
| 2015/0012358 | A1 | 1/2015 | Riesco |
| 2015/0106183 | A1 | 4/2015 | McEvilly et al. |
| 2015/0111564 | A1 | 4/2015 | Urbanek |
| 2015/0113096 | A1 | 4/2015 | Svendsen et al. |
| 2016/0217496 | A1 * | 7/2016 | Tuchman ........... G06Q 30/0269 |

OTHER PUBLICATIONS

"The Gimbal Context Aware Platform—Digital Insights Into the Physical World", Nov. 2013, Revision 1, Qualcomm Retail Solutions, Inc., 9 pages.
Wingfield, "Another Super Bowl Ad Fest, This Time on the Cellphone", Jan. 2014, The New York Times, http://mobile.nytimes.com/2014/01/31/technology/For-Super-Bowl-Personalized-Phone-Al . . . Retrieved Nov. 9, 2015, 7 pages.
"Configure location-aware printing", http://www.techveze.com/configure-location-aware-printing. Retrieved Jul. 30, 2015, 5 pages.
Gifford, "Digital Kiosks as Big Data Collection Hubs", Jun. 2014, http://blog.getturnstyle.com/digital-kiosks-as-big-data-collection-hubs. Retrieved Nov. 9, 2015, 5 pages.
Miners, "Facebook's location-based ads pitch you on the store you just walked by", Oct. 2014, IDG News Service, http://www.pcworld.com/article/2719552/facebooks-locatonbased-ads-c . . . Retrieved on Nov. 9, 2015, 4 pages.
Kim, "Matchbox 20 Uses Geo-Fencing Technology to Track Concert Attendees . . . ", Aug. 2013, Digital Music News, http://www.digitalmusicnews.com/permalink/2013/08/12/geofencing. Retrieved on Jul. 30, 2015, 4 pages.
Spector, "Geo-Fencing the Amphitheater", Jun. 2014, http://www.geomarketing.com/geo-fencing-the-amphitheater Retrieved on Jul. 30, 2015, 5 pages.
"Gimbal Platform Shows How Real-Time Relevance Can Deliver Brand Brilliance", Jan. 2014, OnQ Blog, Qualcomm Technologies, Inc., https://www.qualcomm.com/news/onq/2014/01/13/gimbal-platform-shows-how-real-time- . . . Retrieved on Jul. 30, 2015, 5 pages.
De Boer, "The Digital Kiosk", Mar. 2010, http://popucity.net/the-digital-kiosk/. Retrieved on Jul. 30, 2015, 3 pages.
"How location-based advertising is reshaping marketing at events", 2015, Annalect, http://www.annalect.com/location-based-advertising-reshaping-marketin . . . Retrieved on Nov. 9, 2015, 2 pages.
Hannak, et al., "Measuring Price Discrimination and Steering on E-commerce Web Sites", Nov. 2014, IMC, Vancouver, BC, Canada, http://dx.doi.org/10.1145/2663716.2663744. Retrieved on Nov. 9, 2015, 14 pages.
Chorianopoulos, "Personalized and mobile digital TV applications", 2008, Multimed Tools Appl, Springer Science + Business Media, LLC. Retrieved on Nov. 9, 2015,10 pages.
Tode, "Sports teams engage mobile fans via in-stadium interactive displays", May 2014, Mobile Marketer, http://www.mobilemarketer.com/cms/news/content/17809.html?utm_refe . . . Retrieved on Nov. 9, 2015, 2 pages.
O'Brien, "Starbucks UK Debuts Location-Based Mobile Ads; Beacons Meet Shoppers on Regent St.", Dec. 2014, http://www.clickz.com/clickz/news/2385173/starbucks-uk-debuts-lcoatio . . . Retrieved on Nov. 9, 2015, 10 pages.
"What location-based pricing mobile apps exist?", https://www.quora.com/what-location-based-pricing-mobile-apps-exst . . . Retrieved on Nov. 9, 2015, 1 page.
Romanov, "Why digital signage and mobility are the future of marketing", http://www.mobilecommercedaily.com/why-digital-signage-and-mobility-are-the-future-of . . . Retrieved on Jul. 30, 2015, 5 pages.
Gabay, "How Retailers are Using Location Awareness Technology to Track Buyers' Habits", http://www.em.avnet.com/en-us/design/technical-articles/Pages/Artioles/Big-Data-How-Re . . . Retrieved on Jul. 30, 2015, 2 pages.

* cited by examiner

FACILITATING DYNAMIC EVENT-BASED CONTENT DISTRIBUTION

TECHNICAL FIELD

The subject disclosure relates generally to mobile communications, and, for example, to systems, apparatuses and/or methods of facilitating dynamic event-based content distribution in mobile communications systems.

BACKGROUND

Mobile communication has grown exponentially and the trend is for continued growth at the same or greater rates. Additionally, mobile device users demand the ability to receive and use content while mobile. However, cloud-based systems are often inefficient and/or unable to provide tailored content likely to be of significant value to users. Accordingly, opportunities exist for systems, methods and/or apparatus to do better when delivering content to mobile devices.

DETAILED DESCRIPTION

Figure 1:
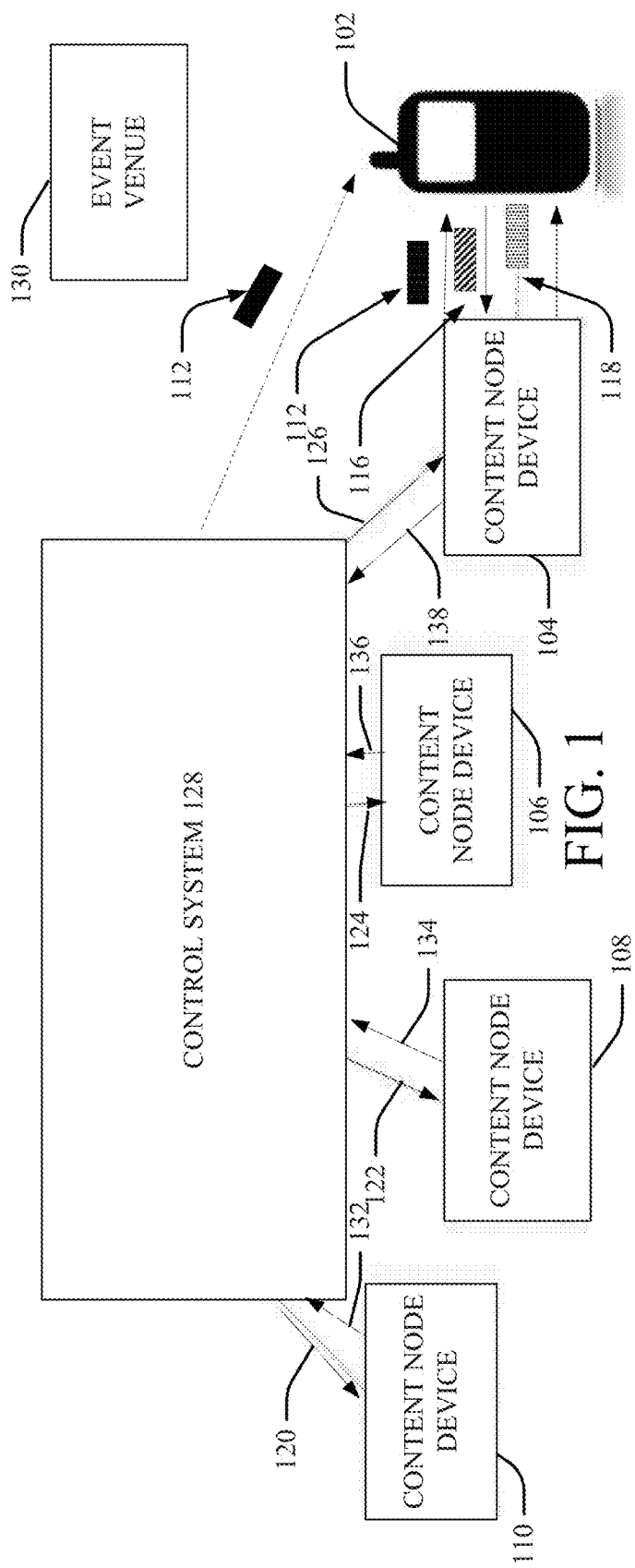
FIG. 1 illustrates an example schematic diagram of a system that facilitates dynamic event-based content distribution in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

Mobile communications have grown exponentially and the trend is for continued growth at the same or greater rates. Additionally, mobile device users demand the ability to receive and use content while mobile. However, cloud-based systems are often inefficient and/or unable to provide tailored content likely to be of significant value to users. Accordingly, opportunities exist for systems, methods and/or apparatus facilitating efficient and directed content delivery to mobile devices.

In some systems, geo-positioning can be employed to facilitate content delivery from cloud-based networks. However, such systems can be disadvantageously inefficient, which can hamper the ability to serve a sizeable number of mobile devices. Further, many systems that seek to distribute content focus on providing such service for vehicular traffic, which can be inefficient or of reduced value in cases in which the mobile traffic is based on non-automotive and/or foot traffic. Additionally, existing systems generally consider no context about time with regard to the content offered and, therefore, a user of a mobile device can be at any number of different types of events (e.g., concert, wedding, theater, sporting event) and content may not be tailored to such potentially diverse situations.

One or more embodiments described herein systems, methods and/or apparatus that facilitate dynamic event-based content distribution employing content node devices that are within a defined proximity to an event to render event-specific content, advertisement and/or information in a granular and/or physical spectrum. As such, one or more embodiments can tailor content to the specific type of event or circumstance (e.g., wedding, conference, sporting event) at which the mobile device to which the content or advertisement is offered is located.

Accordingly, one or more of the embodiments described herein are directed to content provisioning for mobile devices that traverse one or more different routes via foot traffic or other non-automotive travel, although mobile devices that traverse paths via automotive traffic can also be served with the embodiments described herein. The devices of focus are therefore mobile devices as opposed to stationary devices, although stationary devices can also be served.

In one embodiment, a method is described. The method comprises: evaluating, by a device comprising a processor and communicatively coupled to a content node device of content node devices, a criterion to select content of a plurality of content to present from the content node device to a mobile device, wherein the criterion and selected content are associated with a time-limited event, the time-limited event occurring independent of the mobile device. The method also comprises selecting, by the device, a value of values for the selected content, wherein the selected value is based on first geographical information for the time-limited event and second geographical information for the mobile device.

In one embodiment, a method is described. The method comprises determining, by a device comprising a processor and communicatively coupled to a content node device of content node devices, a criterion based on which to determine whether to present a mobile device information indicative of access to obtain content from the content node device, wherein the criterion and the content are associated with an event determined to have at least a defined time-sensitivity and determined to be within a defined proximity to the content node device. The method also includes generating, by the device, information to cause the content node device of the content node devices to offer the content to the mobile device based on the determining of the criterion.

In another embodiment, an apparatus is described. The apparatus comprises a processor; and a memory that stores executable instructions that, when executed by the processor, facilitate performance of operations. The operations comprise: determining a presence of a mobile device within a communication range of the apparatus; determining a characteristic of mobile device information determined to be associated with the mobile device; and generating offer information representative of an offer, to the mobile device, of selected content of a plurality of content, the selected content having an associated selected value of a plurality of values, wherein the offer information is generated based on the characteristic of the mobile device information and is time-limited based on a time associated with an event, the event occurring independent of the mobile device.

In another embodiment, another apparatus is described. The apparatus comprises a processor; and a memory that stores executable instructions that, when executed by the processor, facilitate performance of operations. The operations comprise receiving electronic notification information, from a content node device of content node devices over a wireless network and associated with acquisition of a first product via the content node device, wherein the receiving is based on a location of the apparatus relative to a route of routes with which a communication region of the content node device overlaps and an event associated with the apparatus, wherein the event is time-limited and not related to an action of the mobile device. The operations also comprise transmitting purchase information to the content node device to enable acquisition of the first product, wherein the transmitting is based on the receiving.

FIG. 1 illustrates an example schematic diagram of a system that facilitates dynamic event-based content distribution in accordance with one or more embodiments described herein. System 100 can include at least one mobile device 102, one or more content node devices 104, 106, 108, 110 and/or a control system 128. In various embodiments, one or more of the mobile device 102, one or more content nodes 104, 106, 108, 110 and/or the control system 128 can be electrically and/or communicatively coupled to one another to perform one or more functions of the system 100. Alternatively, in some embodiments, the system 100 can include one or more of content node devices 104, 106, 108, 110 and a control system 128. The system 100 can facilitate offer and/or delivery of tailored event-based content and/or advertisement to mobile device 102 via one or more of the content node devices 104, 106, 108, 110 and/or, in some embodiments, via the control system 128 directly.

The mobile device 102 can include hardware, software and/or a combination of hardware and software and can be configured to transmit and/or receive information to/from the control system 128 and/or to/from the content node devices 104, 106, 108, 110. For example, the mobile device 102 can be any device configured to move from place to place while communicating over a wireless channel. In various embodiments, the mobile device can be or include a smart phone, laptop, personal digital assistant or any other device configured to transmit and/or receive information and/or content over a wireless channel. In some embodiments, the mobile device 102 is configured to receive content and/or advertisement over a wireless or wired channel from the one or more of the content node devices 104, 106, 108, 110 and/or from the control system 128. The mobile device 102 is configured to transmit purchase and/or acquisition information for purchase or acquisition of content and/or physical products.

As shown in FIG. 1, the one or more content node devices 104, 106, 108, 110 are provided at disparate locations. The locations of the content node devices 104, 106, 108, 110 can be dictated by information received by the control system 128 at the one or more content node devices 104, 106, 108, 110. For example, the control system 128 can transmit information 120, 122, 124, 126 to the content node devices 104, 106, 108, 110 regarding the specific respective locations over which the content node devices 104, 106, 108, 110 should communicate with mobile devices (e.g., mobile device 102). For example, the position of a particular content node device of the content node devices 104, 106, 108, 110 can be determined by the control system 128 as a function of a location of an event with which the mobile device 102 (or a user of the mobile device 102) is associated. The one or more content node devices 104, 106, 108, 110 can be positioned at specific locations and have corresponding specific coverage areas.

As described, in some embodiments, the locations communicated by information 120, 122, 124, 126 can be determined by the control system 128 based on the location of event venue 130. For example, the location of the event venue 130 can be determined and one or more routes (not shown) to the event venue 130 can be determined such that a mobile device (e.g., mobile device 102) can be offered content and/or advertisement for content or products while the mobile device is within the coverage area of one or more of the content node devices 104, 106, 108, 110.

The control system 128 can transmit information 120, 122, 124, 126 indicating the coordinates, longitude/latitude, streets and/or other indicators of the one or more routes to or within a particular proximity of the event venue 130. Further, in some embodiments, the control system 128 can identify one or more ideal locations at which to offer content within a coverage area of a content node device. In some embodiments, the identification can be based on current and/or past or historical transit patterns and/or purchase patterns. Accordingly, the content node devices 104, 106, 108, 110 can be location mapped with field of reach against specific routes that vehicles and foot traffic traverse and/or mapped against local event locations, retail outlets. In some embodiments, the control system 128 can offer to sellers of content and/or physical products an opportunity to sell content or physical products via a particular content node device at different pricing based on the locations of the content node devices 104, 106, 108, 110, popularity of transit routes to the event and/or retail patterns.

For example, in some embodiments, the control system 128 can dynamically offer space in a content node device 104 to sellers of content who want to sell, and/or to advertisers who want to advertise, via one or more of the content node devices 104, 106, 108, 110. For example, the price for content or an advertisement can be a first price along a first route or a second price along a different route. The higher priced content or advertisement can be placed along a route that offers greater convenience to the event (perhaps the route is closer to the event or an otherwise more heavily traveled route for one or more different reasons). Topography can affect the pricing offered to sellers. For example, a hilly route can be less likely to be traveled and therefore a price offered to a seller to sell content and/or advertisement for content node devices along the route that is associated with such topography can be less than a route along a flat topography, which may be more likely to be heavily traveled and therefore sales are more likely.

The particular content to be offered by one or more of the content node devices 104, 106, 108, 110 can be dictated by the control system 128 based on the type of event associated with the event venue 130. In some embodiments, the content node device (e.g., content node device 104) can determine that the mobile device 102 is within the coverage area (not shown) of the content node device 104. In various embodiments, the content node device 104 and/or the control system 128 can make an offer 112 of particular event-related content to the mobile device 102. The mobile device 102 can process the offer received and/or transmit to the content node device 104 purchase or acquisition information 116 to purchase or acquire the content. The purchase or acquisition information 116 can be or include information such as credit card information, mobile device information, information identifying the content, and/or other information that can be employed to reserve and/or purchase content 118.

The mobile device 102 can receive the content 118 from the content node device 104 and/or the control system 128 in various different embodiments. The content 118 can be electronic or physical content in various different embodiments. For example, the content 118 can be any of a number of different types of electronic information communicated and/or delivered to the mobile device 102 or otherwise received at the mobile device 102. The content 118 can be delivered over wireless or wired channels in various different embodiments. Examples of content 118 can be or include, but are not limited to, scorecards, music, videos, movies, games, reading material, brochures or any other electronic information or data that can be processed by the mobile device 102 via receipt on a wired or wireless communication channel to which the mobile device 102 is communicatively coupled.

In some embodiments, the content 118 can be physical content that can be purchased and/or reserved via the mobile device 102. The user of the mobile device 102 can obtain, acquire or otherwise procure the product purchased via the mobile device 102 either proximate to the time of purchase or sometime after the purchase. For example, in one embodiment, a product can be procured by the mobile device 102 and picked up by the user of the mobile device 102 inside of the event venue 130. As another example, a physical vendor can be associated with an electronic vendor. For example, a user of the mobile device 102 can purchase a physical product (e.g., t-shirt) via the content node device 104. After purchase, the physical product can be presented to the user of the mobile device (e.g., a person can deliver the physical t-shirt to the user when the user walks through the gates of the event venue 130). Thus, the user has efficiently procured the physical product without waiting in line and other inconveniences.

In yet another example, the content node device 104 and/or the control system 128 can determine that a user has entered the event venue 130 through a particular gate and delivery of the previously-purchased product can be provided to the particular gate at which the mobile device 102 associated with the user has been detected by the control system 128 and/or the content node device 104.

The event-related content can be offered based on one or more different information and/or methods of evaluation by the control system 128 and/or one or more of the content node devices 104, 106, 108, 110. As used herein, the term "event-related content" and "content" are intended to have the same meaning. By way of example, but not limitation, the event-related content 118 can be offered to the mobile device 102 based on a determination made by the content node device 104 or the control system 128 that the mobile device 102 is within the coverage area of the content node device. As another example, the event-related content 118 can be offered to the mobile device 102 based on determination by the content node device 104 or the control system 128 that the mobile device 102 is within the coverage area of the content node device and the mobile device 102 has associated mobile device information that indicates the user of the mobile device 102 is or will be a participant of the event. For example, the user of the mobile device 102 can be determined to be a participant of the event if the mobile device information indicates indicia of a purchase for or the presence of a ticket or pass for admission to the event.

In various embodiments, the information 120, 122, 124, 126 received by and/or determined by the one or more of the content node devices 104, 106, 108, 110 can be indicative of one or more time periods during which the event-related content 118 can be offered by one or more of the content node devices 104, 106, 108, 110. For example, in some embodiments, the control system 128 can identify and/or transmit information 120, 122, 124, 126 indicative of a time or time period during which particular content 118 can be offered via the one or more content node devices 104, 106, 108, 110. Thus, the control system 128 can determine that content A can be offered 9 am-1 pm via content node device 104 while content B can be offered 9 am-9 pm via content node device 106. As another example, the control system 128 can determine that content A can be offered 9 am-1 pm via content node device 104 while content B can be offered 9 am-9 pm via content node device 104. In various embodiments, the control system 128 can determine the time period to offer the particular content relative to the timing of an event. For example, control system 128 can determine that content A should be offered only prior to the event while content B should be offered prior to, during and/or after the event. As such, the control system 128 and/or the content node device 104 can assemble content electronically in a methodical method to project the appropriate offers to potential customers and deliver the same to the mobile devices (e.g., mobile device 102) as the mobile devices traverse a route near the event. The routes can be determined within the system 100 by the control system 128 based on the likelihood of a defined number of event-related travelers along the route, the proximity to the event or the like.

The content can be offered based on the route and/or based on feedback from the one or more content node devices 104, 106, 108, 110. The method of determining which content to offer, which route, which time period, pricing and/or other information can be updated and/or modified by the control system 128 and/or content node devices 104, 106, 108, 110 based on various different learning methods including, but not limited to, artificial intelligence. As the purchases change, the content node devices 104, 106, 108, 110 and/or the control system 128 can change the content and/or offerings of the particular content node device. In some embodiments, the control system 128 and/or content node device 104 can determine whether a user/mobile device represents a repeat customer, season ticket holders, or any number of other characteristics and modify the offerings to the user/mobile device accordingly.

Accordingly, the control system 128 can select content node device 104 to be located at a location that provides wireless connectivity to a mobile device 102 over a particular route. The different content node devices (e.g., content node devices 104, 106, 108, 110) can be controlled and/or receive information from the control system 128 to provide coverage over a particular route. A first content node device 104 can provide coverage for a first route leading to or having one or more portions that are proximate to a particular event of interest while a second content node device 104 can provide coverage for a second route leading to or having one or more portions that are proximate to the particular event. Thus, different routes can be determined by the control system 128.

The control system 128 can therefore send detailed information 120, 122, 124, 126 to one or more of content node devices 104, 106, 108, 110 indicating particular content to offer via one or more of the content node devices 104, 106, 108, 110 since different ones of the one or more content node devices 104, 106, 108, 110 can offer different content and/or the same content at different prices and/or at different times or concurrently.

In some embodiments, the information 120, 122, 124, 126 received by and/or processed at one or more of the content node devices 104, 106, 108, 110 can be indicative of pricing for one or more different types of content. In various embodiments, control system 128 and/or the content node devices 104, 106, 108, 110 can offer different content based on the cost and/or type of ticket or pass the user of the mobile device 102 has for a particular event. A more expensive ticket and/or a premium seat ticket and/or a VIP pass for a particular event can result in the cost for content being set to a particular price while the pricing and/or type of content offered to a mobile device with an associated user having a non-premium ticket can differ.

In some embodiments, the control system 128 can determine that content node device 104 can offer different content to different mobile devices. For example, the content 118 offered to mobile device 102 can be based on the mobile device information including, but not limited to, the user of the mobile device, the event ticket or pass information stored in the mobile device 102, the previous or current purchases made via the mobile device 102 and/or an entry point of the event venue 130 through which the mobile device 102 passes to access the event. Accordingly, for example, the control system 128 can control the content node device 104 to offer content of a first type to a certain mobile device and content of a second type to a second mobile device.

In some embodiments, the control system 128 can receive feedback 132, 134, 136, 138 from one or more of the content node devices 104, 106, 108, 110 regarding the sales of the content. Based on the feedback 132, 134, 136, 138, the control system 128 can modify the particular segments that comprise the route for the content node device, update and/or otherwise modify the parameters of content offered and/or advertisement (e.g., the type, identity and/or price of content offered, the type of advertisement or the like).

In one or more embodiments, context about time and/or other neighboring users around the user can be employed. As such, different content and/or pricing can be offered based on considerations such as whether the user of the mobile device 102 is located at the site of a wedding, a birthday party or a theater. By way of example, but not limitation, the content node device (e.g., one of content node devices 104, 106, 108, 110) that provides coverage for a particular area can determine mobile device information for a number of mobile devices in the area. Based on this determination and/or information such as similarity in tickets that a number of users may have (e.g., tickets to the same theater performance) the content node device can determine that the mobile devices are associated with users at the same or different events (the same or different theater performances) and/or offer content and/or advertisement tailored to that genre of theater performance, other theater performances or the like based upon such determination.

In various embodiments, the content node device 104 and/or the control system 128 can employ one or more methods to set pricing and/or time availability of an offer for content. In some embodiments, a defined amount of time before an event, an organization associated with the event can offer content tailored to the event. By way of example, but not limitation, three hours before a concert, a band can transmit, via a content node device, over a wired or wireless channel, an offer of band content (e.g., video clips and songs) to mobile devices having mobile device information indicating that the mobile device is owned or used by an entity that has tickets for the event. Thus, the content node device 104 can offer different content based on the particular event. For example, for an event that is a baseball game or another sporting event, the content can be a score card or roster of players for the team transmitted to the mobile device 102 over a wired or wireless channel. As another example, for an event that is a comic book conference, the content can be sample electronic comic books and/or comic book character physical t-shirts or hats (since the content can be physical and be picked up at a designated location albeit purchased via the mobile device 102). Thus, the control system 128 and/or one or more of the content node devices 104, 106, 108, 110 can cause different content to be offered depending on the type of event.

Accordingly, the control system 128 and/or content node device 104 can align the content towards events that are occurring and that are localized. In some embodiments, the control system 128 and/or content node device 104 can align the content with the routes that users travel with mobile devices (e.g., mobile device 102) travel to events and/or, in another embodiment, align the content with routes that users with mobile devices (e.g., mobile device 102) travel on a regular basis.

In some embodiments, the control system 128 and/or the content node device 104 can be configured to determine which content will be offered and/or the time periods for offering the content based on localized event windows and event time information that can be employed to determine locations for control node devices (e.g., control node device 104) and/or locations at which the content node devices will offer content. In these embodiments, the control system 128 and/or the content node device 104 can provide an inventory of one or more different types of content along one or more different routes connected to, nearby or associated with an event (e.g., musical performance, science fiction event, movie premiere, arts performance, work or professional conference). Thus, the control system 128 can guide the user of the mobile device 102 to the event venue 130.

In some embodiments, overall inventory management of content 118 can be performed via the control system 128 and/or one or more of the content node devices (e.g., content node devices 104, 106, 108, 110). By way of example, but not limitation, for a particular route of the one or more different routes associated with different content node devices 104, 106, 108, 110, the control system 128 and/or a content node device can determine and/or predict information, or otherwise access information, indicating an expectation that at a first content node device (e.g., content node device 104) only a defined number of units of content will be sold at a defined price. In this case, the control system 128 and/or the content node device 104 can control one or more parameters of the particular content 118 such that one or more actions occurs. For example, the content node device 104 can be controlled such that no additional units of that particular content 118 is available after the expected number of units of that particular content 118 are sold. As another example, additional units of that particular content 118 sold after the expected number of units has already been sold can be offered at a higher price. The price for the content 118 can increase by a defined amount, for example, which can be computed and known a priori, dynamically computed and/or changed from time to time based on one or more factors or conditions. In some embodiments, the defined amount can be computed based on any number of factors including, but not limited to, the remaining time until the event related to the content 118 commences, an estimated maximum price that a consumer is likely to pay for the content 118, a current or previous price of the content 118, whether the content 118 is premium content or non-premium content or the like.

In some embodiments, by contrast, if a particular content node device (e.g., content node device 106) is not selling enough units of particular content 118 at a defined price, and another content node device (e.g., content node device 108) is meeting or has exhausted inventory of the particular content 118, the control system 128 can generate and/or transmit one or more communications to one or more content node devices (e.g., content node device 106, 108) to move the particular inventory to content node device 108, reduce the price for the content 118 at content node device 106 so that the price of the particular content 118 that was sold by content node device 108 is the same price at content node device 106 and/or stop the sale of the content 118 at content node device 106.

In some embodiments, the control system 128 and/or content node device 104 can identify a user prior to user purchase based on mobile device information, which can include, for example, a user profile. In some embodiments, a computer (or machine) readable storage medium can be downloaded to the mobile device 102. The computer (or machine) readable storage medium can be employed for delivery of content and can either scan an area surrounding the mobile device 102 for wireless notifications of offers of content and/or advertising from a content node device and/or receive wireless notifications based on where the mobile devices are reporting location to the control system 128.

In some embodiments, the mobile device 102 can download and/or store and/or process commands of a computer (or machine) readable storage medium and generate information at the mobile device 102 indicative of content that can be purchased or acquired in the proximity of the mobile device 102 and/or along the route on which the mobile device 102 is traveling. For example, the mobile device 102 can generate an alert to the user of the mobile device 102 indicating the mobile device 102 is within a defined proximity of a content node device (e.g., content node device 104). The content node device can be on a Wi-Fi network or another form of wireless connection capable of local proximity based processing and storage. The alert can be audio, visual or any number of other formats. The user can activate the alert (e.g., select an option of a pop-up alert) and the mobile device 102 can receive information indicative of content that can be obtained and/or purchased via the content node device 104.

In another embodiment, the mobile device 102 can detect the network (e.g., Wi-Fi) service set identifier (SSID) for the content node device 104 and bind to that SSID to view the available content and promotions and/or receive content from the content node device 104. Thus, unlike a cloud-based systems, in the embodiments described herein, content node devices can be employed as local distribution nodes that are within close physical proximity to an event to render event-specific content, media and information in a very granular and physical spectrum.

In either embodiment, the content can be content that is available for acquisition at a defined location along the route that the mobile device 102 is on or in proximity to the mobile device 102. The user of the mobile device 102 can stop at the defined location, and purchase the content. In some embodiments, the defined location can be a designated location within the coverage area of the content node device 104. As such, the mobile device 102 can access content at a designated location within the coverage area. Further, in some embodiments, two or more sequential offers can be received by the mobile device 102 based on previous purchases. For example, part one of content can be offered to the mobile device 102 at a first location within the coverage area of a content node device and part two of content can be provided at a second location. The mobile device 102 can receive information to guide the user/mobile device to the locations to purchase and/or acquire the content. For example, the mobile device 102 can receive a message indicating that part one of a playlist for tonight's concert can be retrieved from location x and the cost is $2, and then continue 2 blocks in a defined direction (towards the concert) and part two of the playlist can be obtained for 50 cents (or other promotional material can be obtained).

Accordingly, based on the particular user, the content node device 104 can transmit route mapping information to the mobile device 102 to advise or encourage the user of the mobile device 102 to walk or otherwise travel along a particular route. The particular route selected can be a route on which content having a defined likelihood of being amenable to and/or purchased by the user of the mobile device 102 would be provided via a content node device (e.g., content node device 104). In some embodiments, the route can also include one or more sections inside of the event venue 130. For example, a content node device can be placed inside an event venue or have a coverage area that includes one or more inside portions of the venue. Since a user of a mobile device is headed inside of a premium ticket gate or seating area of a venue, for example, the data storage of the content node device can be loaded with premium high price products versus the content node device for users with mobile devices that are sitting in outfield, which can be loaded with less expensive content or different types of content.

Accordingly, in some embodiments, the location of the entrance (e.g., premium gate entrance or regular gate entrance) and/or type of ticket (premium seats or not) a user of the mobile device 102 has can drive what is offered. Accordingly, in some embodiments, the offers are not just location-based; rather, in some embodiments, the offers can be based on the specific user to which the offer is made and/or the user past purchase history or profile. Accordingly, for example, if a user regularly attends a particular event or type of event (e.g., a baseball game) and the content node device or the control system 128 knows the user typically purchases certain content, the content node device can offer such content and/or a package including such content to the user at the gate typically entered by the user.

In some embodiments, the mobile device 102 need not approach a specific electronic apparatus to obtain content; rather, the mobile device 102 need only be within the coverage area (e.g., Wi-Fi radius) of the content node device 104. The coverage area can be a zone of any size dictated by the type of content node device. For example, if the content node device is a Wi-Fi access point device, the zone can be 50-100 feet along one street and 50-100 feet along another street and can therefore encompass an area of 1000 square feet. In some embodiments, the mobile device 102 can receive an alert that indicates that if the mobile device goes to a defined location (e.g., defined location within the coverage area of a content node device, or a brick and mortar retailer, between a certain time) and buy an event ticket, the content node device can offer an additional incentive such as a new release of a particular song. Accordingly, the embodiments described herein can be time-limited relative to the event. The time window over which content or programs are offered can be provided since the embodiments are for event-based distribution and events are typically time-limited. As such, the content offered may only be of significant value for a defined time period (e.g., 2 hours) leading up to an event and after such time period the content and/or goods may be of little or no value.

As such, in some embodiments, the control system 128 can determine an arrangement in which the content is distributed via the content node device at a location at which the user of the mobile device that can obtain the content can also purchase one or more products or services from another vendor. For example, in one embodiment, there can be a deal with a retailer (e.g., STARBUCKS® café) to obtain a product quickly at STARBUCKS® (so there can be a content node device at the retailer location). Or a user can obtain a cup of coffee for $1 and also pick up content (e.g., an electronic score card). The content node device can be refined over time to know the particular amount and/or type of content to load in the content node device for an area due to previous purchases and which content has been heavily purchased in the past, at a certain time of day when a particular demographic enters the retailer or the like. The system 100 can employ methods that are refined over time to know the demographics of the users in the area. The system 100 can be further refined in some embodiments, to take into account upcoming, ongoing or past events in the inventory of content offered.

In some embodiments, the control system 128 can determine one or more different configurations of joint content distribution pairing or coupling a first event venue with an additional event location. In this vein, for example, a first offer can be made for first content at a first location and a second offer for the same content can be made at a second location in a joint content distribution configuration. As an example, offers for content can be made to users who stop by a grocery store on a route for a content node device.

In some embodiments, the mobile device 102 can be tracked by the control system 128 and/or the content node device 104 and the control system 128 and/or the content node device 104 can determine that the mobile device 102 is a defined distance from an event. The mobile device 102 can be offered content accordingly (e.g., a fight song for a team involved in a sporting event) by the content node device 104 for a defined amount or the mobile device 102 can receive other content (e.g., 10 minutes of access inside the stadium of playbacks) so there can be a variation in the type of content offered.

In some embodiments, the mobile device 102 can have computer-readable storage medium or a device that has the ability to do location tracking. Accordingly, in some embodiments, as the mobile device 102 is approaching an event zone (e.g., a periphery around a particular event), whether the mobile device 102 is three blocks away from the event venue, two blocks away from the event venue or in front of door of stadium of the event venue, the type of content will vary accordingly. For example, the type of content available or offered to a mobile device can change and/or the pricing for content can change. For example, the pricing can be more expensive for the same content as the mobile device reaches the event location within the event zone.

In some embodiments, the system 100 can identify the users of the mobile devices that have a defined affiliation for a particular event. The content offered can therefore be based on an affiliation of the user with the particular event. One affiliation can be ownership of a particular type of seat or pass (e.g., premium seat, VIP pass) for a particular concert, for example. Another affiliation can be a type of position at a particular conference (e.g., workshop leader, executives at a work conference) or a role at an event (e.g., season ticket holders at a sports event). The control system 128 can identify the user as the user walks to the event. The offer details can also be based on the past history of purchase from the mobile device 102 (e.g., whether the purchase was made prior to, during or after the event, the price or price range of the purchase, the type of content purchased, etc.).

The pricing can also change if the mobile device 102 has been offered the content and declined previously. The pricing can also change based on the type of association with the event. For example, a premium seat ticket holder can be offered more expensive products and/or products at a higher price than ticket holders at an entry point indicating less expensive seats.

In some embodiments, once a user of the mobile device enters a premium ticket gate and buys a product or content at the premium gate content node device, the control system 128 and/or content node device determines that the user is a premium customer. The information (e.g., contact information) for the user and/or mobile device can be sold to an advertiser. In some embodiments, an advertising space for the user or mobile device can be sold to an advertiser at a higher price than that for a non-premium user. In some embodiments, differential pricing can be offered to the sellers of content and/or advertisers. Also, the advertiser can send the user coupons or other advertisement for premium content or product even after the user leaves the event.

The control system 128 can control the price that a content seller must pay to advertise and/or offer content via a particular content node device on a particular route. Thus, content offered along a route having heavier traffic of mobile devices can have a higher fee for the seller of the content and/or for the content itself than the same or different content offered along a route having less traffic of mobile devices. In some embodiments, the control system 128 can offer the content node device 104 for use to one or more sellers or providers of digital or physical content based on the specific location of the content node device 104 and/or based on popular transit routes to a particular event or patterns around retail. Accordingly, systems, methods and/or apparatus can facilitate selection of one or more optimal or advantageous locations for position of a content node device for a seller offering content at the specific content node device 104.

The control system 128 can facilitate purchase and/or sale of space, to content sellers, in the one or more of the content node devices 104, 106, 108, 10 for content that can be delivered to the mobile device 102 (or, in some cases, can be delivered to a customer associated with the mobile device 102). The seller of content can be sold and/or purchase space via the content node device 104 to have the content node device 104 offer and/or sale or distribute music, videos, pictures, etc. The content offered can be tailored by time, exclusivity, membership and other factors as the mobile device 102 approaches a defined proximity to a content node device 104.

By way of example, but not limitation, the control system 128 can generate one or more aggregate map views created based on where opt-in customers who are likely to purchase an item are likely to be located and the time at which the users are likely to be located at such location. The route view would be created for walking and driving within certain distances by the control system 128. The route and/or alternate routes that rate highly can be employed by the control system 128 to identify the content node device to be loaded with the content, and promotions, as well as notification to the mobile device to display areas where the vending machines are located along the way.

In some embodiments, the control system 128 can create, for sellers and/or advertisers to determine a value point system to weigh inventory, aggregate mapping based on where customers are likely to purchase.

In addition to events, proximity to a retail location that can sponsor particular products to increase foot traffic to the retail location can enable the content node device 104 to facilitate interaction with the retail store via promotional advertisement information or codes, cash register receipts etc. and thus increase interaction with the store. Accordingly, co-marketing arrangements can be made with adjunct event locations.

Figure 2:
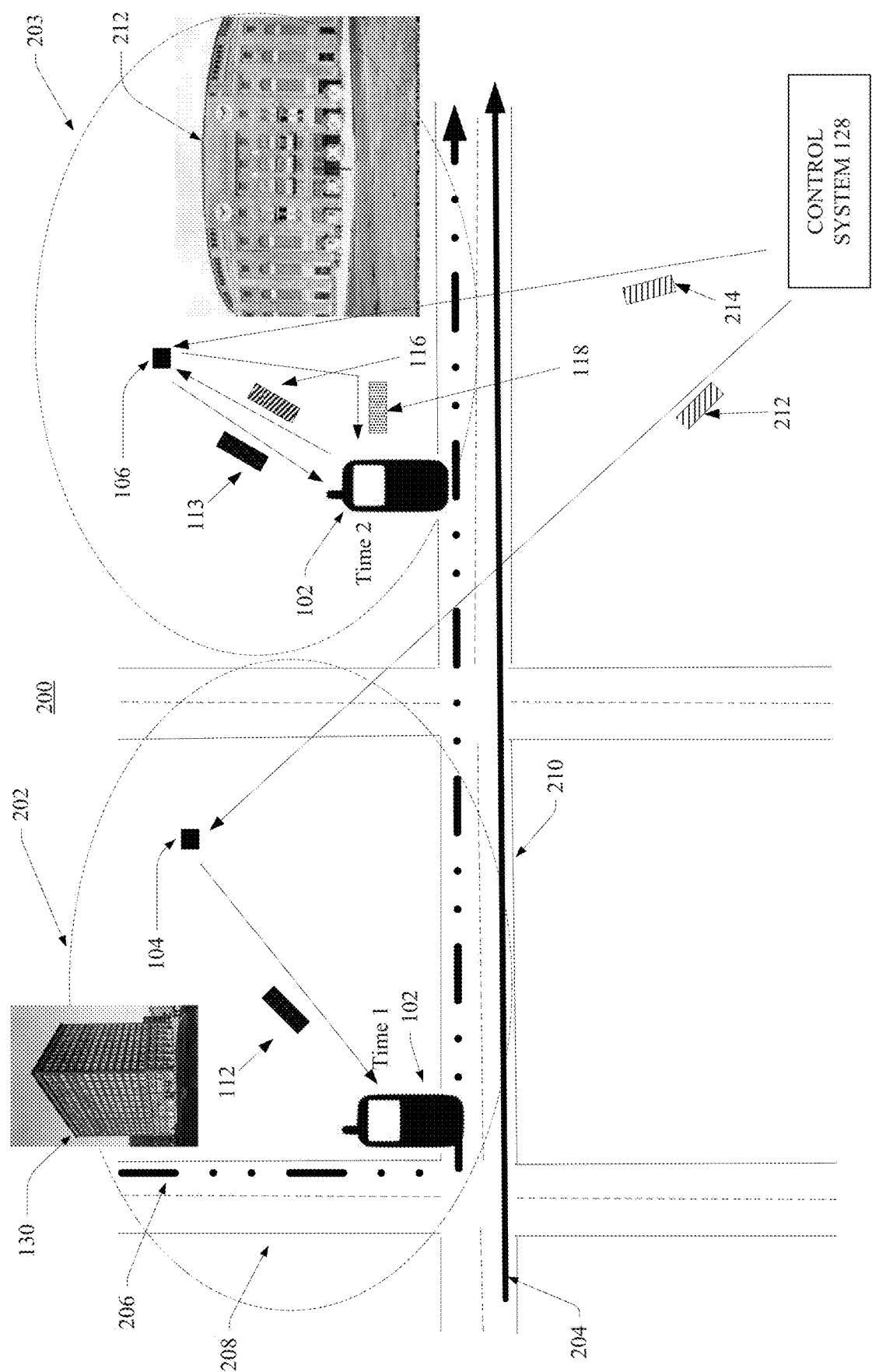
FIG. 2 illustrates an example schematic diagram of a system that facilitates dynamic event-based content distribution employing route mapping and tailored content in accordance with one or more embodiments described herein.

FIG. 2 illustrates an example schematic diagram of a system that facilitates dynamic event-based content distribution employing route mapping and tailored content in accordance with one or more embodiments described herein. Repetitive description of like elements employed in other embodiments described herein is omitted for sake of brevity.

As shown in FIG. 2, content node device 104 is associated with coverage area 202 while content node device 106 is associated with coverage area 203. Control system 128 is configured to transmit information 212 to content node device 104 and information 214 to content node device 106. Information 212, 214 can include information such as the content to offer from the respective content node devices 104, 106 and/or other parameters such as the time and/or pricing of the content to offer. In some embodiments, information 212, 214 can include information such as a change in location or coverage area for a respective content node device and/or route information. For example, control system 128 has devised route 206 along streets 208 and 210 and through coverage areas 202, 203 while devising route 204 along street 210 and through coverage area 202. Event venues 130 and 212 are in coverage areas 202 and 203, respectively, and therefore respectively associated with content node devices 104 and 106, respectively.

By way of examples, but not limitation, event venue 130 can be associated with a work conference event while event venue 212 can be associated with a sporting event. At time 1, mobile device 102 is within coverage area 202 and therefore either receives an alert regarding an offer 112 of content and/or advertisement from content node device 104. The offer 112 can be for content or including advertisement that is tailored to the work conference at the event venue 130. For example, the offer 112 can be for an electronic brochure outlining the workshops and/or meetings scheduled to take place at the event.

At time 2, mobile device 102 can be located within coverage area 203 and can receive an alert or information from content node device 106. The mobile device 102 can receive a different offer 113 of content or advertisement associated with the event that will or has occurred or is occurring at event venue 212. In some embodiments, the content node device 106 determines that the mobile device 102 is associated with mobile device information based on, for example, identifying indicia of a stored electronic ticket for an event at the event venue 212. The mobile device 102 can transmit purchase and/or acquisition information 116 to the content node device 106 to purchase the content offered. The content node device 106 can transmit the content 118 to the mobile device 102 and/or cause the content 118 to be transmitted to the mobile device 102 from a third-party.

Figure 3:
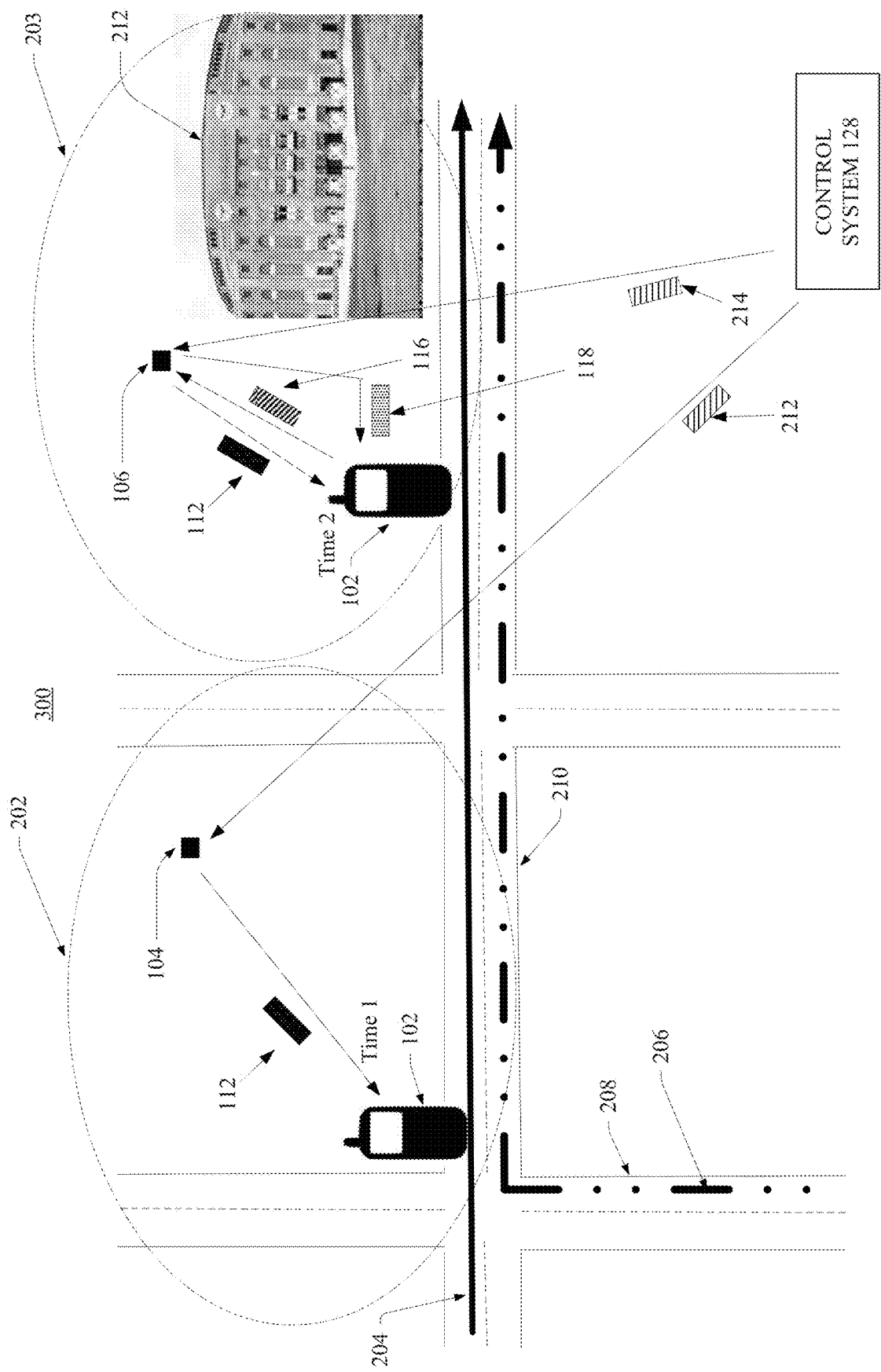
FIG. 3 illustrates an example schematic diagram of a system that facilitates dynamic event-based content distribution employing route mapping and tailored content in accordance with one or more embodiments described herein.

FIG. 3 illustrates an example schematic diagram of a system that facilitates dynamic event-based content distribution employing route mapping and tailored content in accordance with one or more embodiments described herein. Repetitive description of like elements employed in other embodiments described herein is omitted for sake of brevity.

In the embodiment shown in FIG. 3, the mobile device 102 can make an offer 112 of content from content node device 104 or content node device 106 for the event that is occurring or will occur or has occurred at event venue 212. The mobile device 102 can transmit purchase and/or acquisition information 116 to the content node device 106 to purchase the content offered. The content node device 106 can transmit the content 118 to the mobile device 102.

Figure 4:
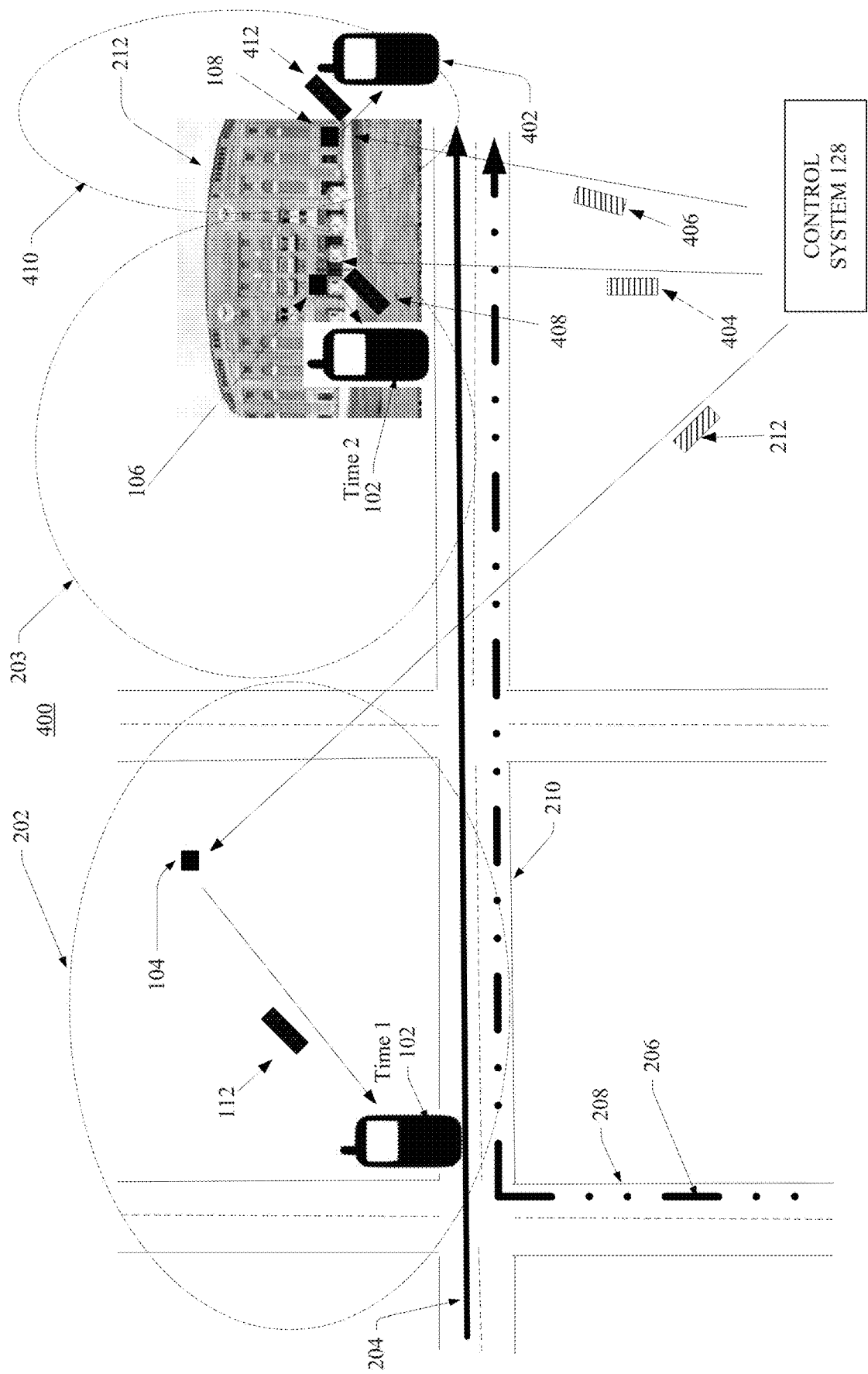
FIG. 4 illustrates an example schematic diagram of a system that facilitates dynamic event-based content distribution employing route mapping and tailored content in accordance with one or more embodiments described herein.

FIG. 4 illustrates an example schematic diagram of a system that facilitates dynamic event-based content distribution employing route mapping and tailored content in accordance with one or more embodiments described herein. Repetitive description of like elements employed in other embodiments described herein is omitted for sake of brevity.

The control system 128 sends information 404 to control node device 106 and information 406 to control node device 108. Based on the information 404, 406 from the control system 128 in the embodiment shown in FIG. 4, the mobile device 102 receives an offer 112 for content from content node device 104 while in coverage area 202. At time 2, the mobile device 102 is in coverage area 203 and receives an offer 408 for content associated with the event at the event venue 212. The mobile device 102 receives a first offer 408 from content node device 106 associated with the premium gate in coverage area 203 at which the mobile device 102 is located. The mobile device 402 receives a second offer 412 from content node device 108 associated with the non-premium gate in coverage area 410 at which the mobile device 402 is located.

In some embodiments, although not shown, the mobile device 102 or mobile device 402 can transmit purchase and/or acquisition information (not shown) to the respective content node devices 106, 108 for content and/or a physical product that can be received by a user of the mobile device 102 or mobile device 402 inside of or at the event venue 212 (e.g., at or in proximity to the premium or non-premium gate that the mobile device 102 or the mobile device 402 enters).

Figure 5:
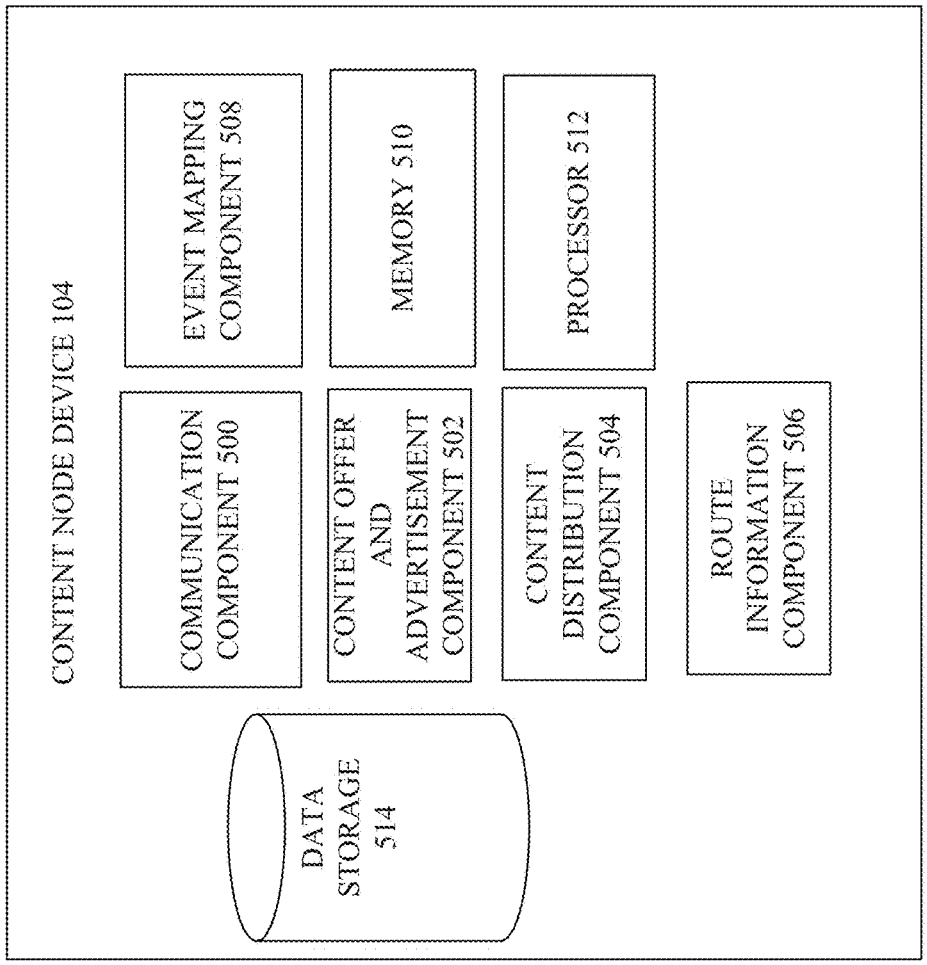
FIG. 5 illustrates an example block diagram of a content node device that can facilitate dynamic event-based content distribution in accordance with one or more embodiments described herein.

FIG. 5 illustrates an example block diagram of a content node device that can facilitate dynamic event-based content distribution in accordance with one or more embodiments described herein. Repetitive description of like elements employed in other embodiments described herein is omitted for sake of brevity.

With reference to FIGS. 1 and 5, content node device 104 can be configured to offer, provide and/or facilitate provisioning of event-based and/or time-limited content and/or advertisement to the mobile device 102. Accordingly, the content node device 104 can be or include software, hardware and/or a combination of software and hardware that can offer and provide specific tailored content to one or more mobile devices based on an event and/or subject to the time constraints or time-related characteristics of an event.

In various embodiments, the content node device 104 can be or include any device configured to provide wireless or wired communication with the mobile device 102. In some embodiments, the content node device 104 can be any device able to communicate with the mobile device 102 over a wireless or a wired network. In this regard, the content node device 104 can broadcast and/or transmit information indicative of one or more different offers, purchase information for content and/or advertisement of content or other products to the mobile device 102. By way of example, but not limitation, the content node device 104 can be or include an access point device, laptop and/or personal computer (PC).

As shown in FIG. 5, the content node device 104 can include a communication component 500, content offer and advertisement component 502, content distribution component 504, route information component 506, event mapping component 508, memory 510, processor 512 and/or data storage 514. In various embodiments, one or more of the communication component 500, content offer and advertisement component 502, content distribution component 504, route information component 506, event mapping component 508, memory 510, processor 512 and/or data storage 514 can be communicatively and/or electrically coupled to one another to perform one or more functions of the content node device 104.

The communication component 500 can be configured to communicate with the control system 128 and/or one or more mobile devices (e.g., mobile device 102) information to facilitate event-based content distribution. In some embodiments, the communication component 500 can transmit and/or receive information indicative of content to offer to a particular mobile device (e.g., mobile device 102) and/or other parameters of the content (e.g., pricing, time period during which to offer the content, users or types of users to which to offer the content or the like). The communication component 500 can also receive information regarding a coverage area to which to broadcast or monitor to detect the presence of mobile devices. The communication component 500 can transmit content purchased by the mobile device and/or advertisement to the mobile device in some embodiments.

The content offer and advertisement component 502 can identify, select and/or generate information about content and advertisement to offer to a mobile device 102. The content distribution component 504 can receive information for distributing the content (or, in some embodiments, the type of content) and/or for offering the content to a mobile device 102. In various embodiments, the content distribution component 504 can determine the content, advertisement and/or type of content to offer based on information received from the control system 128, based on mobile device information from a mobile device detected.

The route information component 506 can receive information about a particular route along which to transmit content and/or advertisement information. The route selected and/or the makeup of the route can be based on any number of factors.

The event mapping component 508 can generate information about the location of an event. For example, in some embodiments, the event mapping component 508 can generate longitude/latitude, text or visual information about the location of an event.

Memory 510 can be a computer-readable (or machine-readable) storage medium storing computer-executable instructions and/or information configured to perform one or more of the functions described herein with reference to the content node device 104. For example, in some embodiments, the memory 510 can store computer-readable storage media associated with determining the content to offer the mobile device 102, the timing of the content offer relative to the timing of the event, whether information has been received for distributing the content, distribution of the content and the like.

In some embodiments, content information (e.g., type of content to offer a particular mobile device, price for particular content, amount of remaining particular content) or the like can be stored in the data storage 514 and/or otherwise accessible to the content node device 104 over a network. The processor 512 can perform one or more of the functions described herein with reference to the content node device 104. The functions can include, but are not limited to, receiving and/or processing information from the control system 128 regarding content to offer to a particular mobile device, time periods during which to offer a particular content at a first price and/or a second price, the price at which to offer content to a first mobile device as compared to the price at which to offer the same or different content at a second price, event information (e.g., time and/or location and/or type of an upcoming, ongoing or past event), route information regarding particular routes over which to broadcast a signal or the like.

Figure 6:
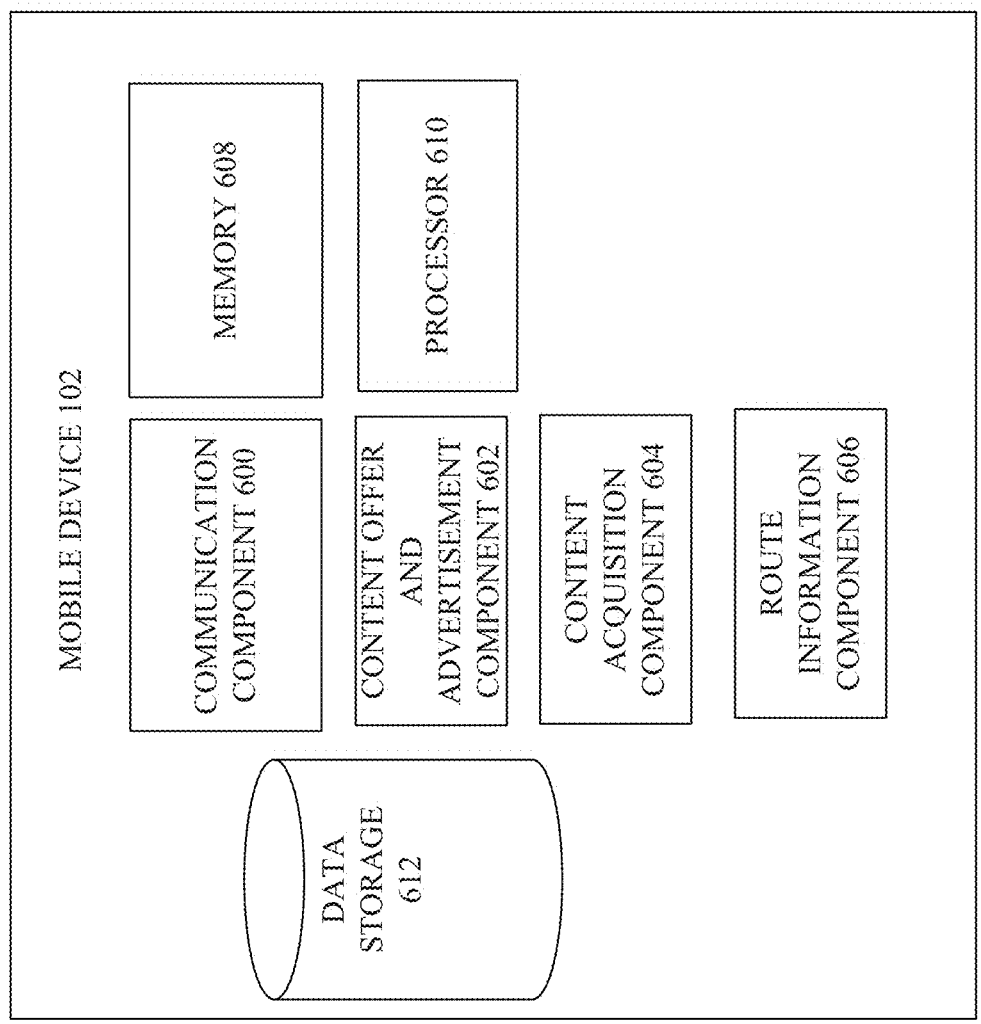
FIG. 6 illustrates an example block diagram of a mobile device for which dynamic event-based content distribution can be facilitated in accordance with one or more embodiments described herein.

FIG. 6 illustrates an example block diagram of a mobile device for which dynamic event-based content distribution can be facilitated in accordance with one or more embodiments described herein. Repetitive description of like elements employed in other embodiments described herein is omitted for sake of brevity. In some embodiments, the mobile device 102 can be or include a smart phone, a laptop, a tablet, a wearable device or any number of different types of devices that can be mobile from time to time.

The mobile device 102 can include a communication component 600, content offer and advertisement component 602, content acquisition component 604, route information component 606, memory 608, processor 610 and/or data storage 612. In various embodiments, one or more of the communication component 600, content offer and advertisement component 602, content distribution component 604, route information component 606, memory 608, processor 610 and/or data storage 612 can be communicatively and/or electrically coupled to one another to perform one or more functions of the mobile device 102.

The communication component 600 can transmit and/or receive information including, but not limited to, content offers, advertisement, purchasing information for content acquisition, content and the like. In some embodiments, the communication component 600 can generate an alert to the user of the mobile device 102 indicating the mobile device 102 is within a defined proximity of a content node device (e.g., content node device 104). The communication component 600 can transmit to a content node device (e.g., content node device 104) purchase and/or acquisition information for purchasing and/or acquiring content and/or a physical product.

In some embodiments, the communication component 600 can detect the network (e.g., Wi-Fi) service set identifier (SSID) for a content node device 104 and bind to that SSID to view the available content and promotions as well as receive content from the content node device.

The content acquisition component 604 can generate information to acquire and/or purchase content. For example, in some embodiments, the content acquisition component 604 can generate purchase information such as credit card information to send to the content node device for purchase or acquisition of content.

The route information component 606 can provide information regarding a route along which the mobile device 102 should travel or is traveling to obtain and/or acquire content. In some embodiments, the route information component 606 can provide text and/or visual indicia that either shows a route that a user of the mobile device 102 can follow to reach a particular destination (e.g., destination at which content can be retrieved and/or an event destination).

Memory 608 can be a computer-readable storage medium storing computer-executable instructions and/or information configured to perform one or more of the functions described herein with reference to the mobile device 102.

For example, in some embodiments, the memory 608 can store computer-readable storage media associated with receiving and/or processing an offer for content and/or advertisement for content, determining the content to acquire from the mobile device 102, identifying a location along a route (including, but not limited to, at an event location) at which to obtain and/or purchase content, receiving content and the like. In some embodiments, content information (e.g., content received by the mobile device), advertising information or the like can be stored in the data storage 612 and/or otherwise accessible to the mobile device 102 over a network. The processor 610 can perform one or more of the functions described herein with reference to the mobile device 102. The functions can include, but are not limited to, receiving and/or processing advertising information and/or offers for content, processing and/or transmitting information for acquisition of the content or the like.

Figure 7:
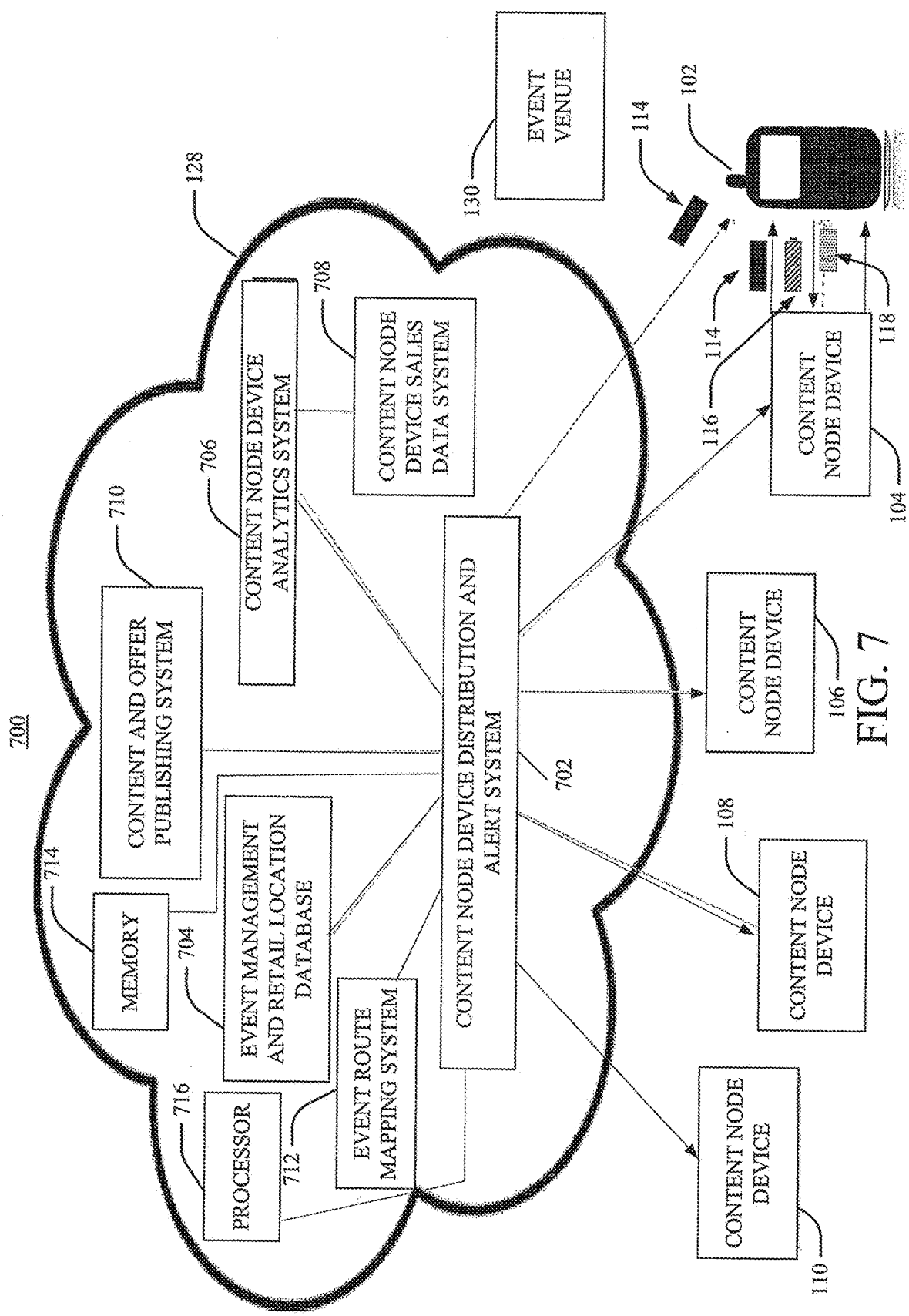
FIG. 7 illustrates an example schematic diagram of another system that facilitates dynamic event-based content distribution in accordance with one or more embodiments described herein.

Another embodiment of the control system 128 is shown in FIG. 7. As shown, control system 128 can include one or more different components. For example, in one embodiment, the control system 128 can include a content node device distribution and alert system 702, event management and retail location database 704, content node device analytics system 706, content node device sales data system 708, content and offer publishing system 710, event route mapping system 712, memory 714 and/or processor 716. Repetitive description of like elements employed in other embodiments described herein is omitted for sake of brevity.

In various embodiments, one or more of the content node device distribution and alert system 702, event management and retail location database 704, content node device analytics system 706, content node device sales data system 708, content and offer publishing system 710, event route mapping system 712, memory 714 and/or processor 716 can be electrically and/or communicatively coupled to one another to perform one or more functions of control system 128 described herein with reference to FIG. 1 and/or FIG. 7. In various embodiments, the content node device distribution and alert system 702, event management and retail location database 704, content node device analytics system 706, content node device sales data system 708, content and offer publishing system 710, event route mapping system 712, memory 714 and/or processor 716 can be or include hardware, software and/or a combination of hardware and software.

The control system 128 can transmit and/or receive information to/from one or more different components of the control system 128 as shown in system 700 of FIG. 7. For example, the control system 128 can receive or otherwise obtain information about one or more characteristics of an event (e.g., location, subject and/or time of an event) and transmit information causing a content node device (e.g., content node device 104) to broadcast and/or transmit information about content offered for sale based on the event information.

The event management and retail location database 704 can store information about one or more different events. For example, the event management and retail location database 704 can provide information that indicates context and stores event information. For example, the event management and retail location database 704 can include information such as the locations of the content node devices 104, 106, 108, 110 in relation of the location of the events. In some embodiments, the event management and retail location database 704 can house the location, timing and type of event that would be mapped to a publishing/distribution request from a seller of content (e.g., a Kenny Chesney concert on August 15th at 8 PM Philips Arena).

The event route mapping system 712 can generate information indicative of one or more routes to and/or from an event or otherwise related to a path of a mobile device associated with (e.g., having a user with tickets to) an event. In some embodiments, the event route mapping system 712 can generate and/or create aggregate map views, aggregate map information or the like based on where opt-in customers who are likely to purchase content are likely to be located and when a route view would be created for walking and driving within certain distances by the event route mapping system 712. That route in addition to alternatives that rate highly can be used to identify the particular content node devices to be loaded with the content, and promotions, as well as notification to the mobile device application to display areas where the content node devices are located along the way.

The content node device distribution and alert system 702 can determine information such as the location and/or density and/or distribution of one or more content node devices 104, 106, 108, 110. The desired location and/or region of broadcast and/or transmission of signal by the one or more content node devices 104, 106, 108, 110 can be determined in some embodiments.

The content and offer publishing system 710 can determine information indicative of content to offer to a mobile device and/or content to offer from a content node device 104 or device associated with the control system 128. In some embodiments, the content and offer publishing system 710 can also provide information regarding the pricing and/or time period during which to offer particular content.

The content node device sales device system 708 can determine the sales for one or more types of content and/or for one or more content items. In some embodiments, the sales can be sales for a particular mobile device and/or sales for particular content.

The content node analytics device 706 can receive information from the content node device sales data system 708 and generate information regarding the sales and/or content. For example, in some embodiments, the content node analytics device 706 can generate a prediction regarding anticipated sales for particular content and/or regarding anticipated sales for a particular mobile device. In some embodiments, the content node device analytics device 706 can obtain and/or evaluate sales results for a type of event and predict the rating and mapping of where content should be placed to maximize response. The content node device analytics device can also be used by the control system 128 (e.g., the content and offer publishing system 710) to provide pricing of publishing/distribution based on status rating of a location or route. For example, it can cost more to publish to/distribute from a content node device 104 that is in a prime location and has one of the highest sales amounts per event.

In some embodiments, the content node analytics device 706 can determine predicted and/or actual sales at a particular content node device for all content offered by the content node device and/or for one or more particular content (or content type) offered by the content node device. If the particular content node device is not selling content (or the particular content) at a particular rate and/or if a particular number of units have not been sold by a defined time (or a time at which the content node device analytics system 706 evaluates the sales of the content node device), the content node device analytics system 706 can adjust (e.g., reduce) the price for the content overall or for particular content offered by the particular content node device. In some embodiments, the content node analytics device 706 can generate one or more new offers for content to be provided and/or advertised via the particular content node device (e.g., bundling content at reduced prices, buy one get one free offerings). In some embodiments, the content node analytics device 706 can generate control information to be communicated to one or more content node devices to assign content from a lower-selling content node device to a higher-selling content node device. Any number of changes can be made regarding pricing, offers and/or the particular content node devices that offer one or more types of content or content generally. All such embodiments are envisaged.

The event management and retail location database 704 can be populated by retrieving and/or receiving schedule information from the event venue 130 (e.g., Turner field stadium, Fox theatre) as part of a pull mechanism. In some embodiments, a push mechanism can be employed. For example, a third-party can enter an electronic calendar of the event management and retail location database 704 and input information in the calendar indicating an event and/or by type of event.

Memory 714 can be a computer-readable storage medium storing computer-executable instructions and/or information configured to perform one or more of the functions described herein with reference to the control system 128. For example, in some embodiments, the memory 714 can store computer-readable storage media associated with generating information details and/or a command for transmission of an offer for content and/or advertisement for content, determining the content to offer to the mobile device 102, identifying a location along a route (including, but not limited to, at an event location) at which to offer content and the like. In some embodiments, content information (e.g., content to be offered to one or more mobile devices), advertising information or the like can be stored in the data storage (not shown) and/or otherwise accessible to the control system 128 over a network (not shown). The processor 716 can perform one or more of the functions described herein with reference to the control system 128. The functions can include, but are not limited to, identifying one or more of content node devices 104, 106, 108, 110 to offer particular content (e.g., with reference to FIG. 1, content 118) to a particular mobile device (e.g., with reference to FIG. 1, mobile device 102), identifying offer details for a particular content, determining route information for one or more of the content node devices 104, 106, 108, 110 and/or determining event information and corresponding content offer and/or advertisement information.

The embodiments described herein identify and describe various components that use specific information to facilitate dynamic event-based content distribution. However, further detail can be provided regarding one or more databases to facilitate the embodiments, content inventory management reporting back and/or the brokerage system to the sellers and advertisers for sale of the content and/or location of the content node device can be detailed in another application.

Figure 8:
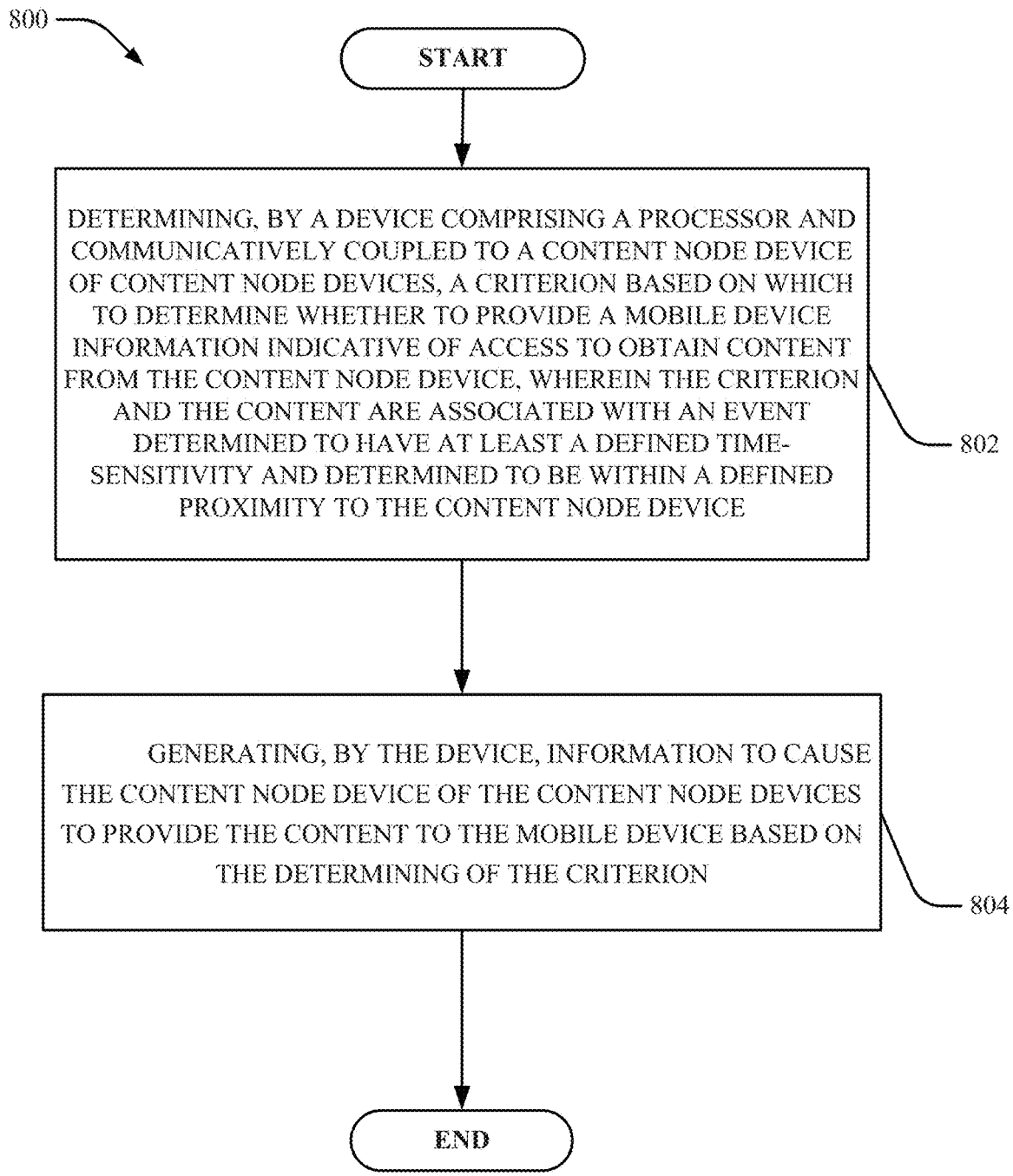
FIGS. 8, 9, 10, 11 and 12 are flowcharts of methods that facilitate dynamic event-based content distribution in accordance with one or more embodiments described herein.

FIGS. 8, 9, 10 and 11 are flowcharts of methods that facilitate dynamic event-based content distribution in accordance with one or more embodiments described herein. Turning first to FIG. 8, at 802, method 800 can include determining, by a device comprising a processor and communicatively coupled to a content node device of content node devices, a criterion based on which to determine whether to present a mobile device information indicative of access to obtain content from the content node device, wherein the criterion and the content are associated with an event determined to have at least a defined time-sensitivity and determined to be within a defined proximity to the content node device. For example, the device can be or include the control system 128 (or, with reference to the embodiment of FIG. 7, the device can be a component of the control system 128).

At 804, method 800 can include generating, by the device, information to cause the content node device of the content node devices to present the content to the mobile device based on the determining of the criterion.

For example, the content can be tailored to the particular event such that a first type of content is offered for a first type of event and a second type of content is offered for a second type of event. In one embodiment, for example, a scorecard or a document including sports trivia can be offered as content for a sports-related event (e.g., baseball game) while, for a work conference sponsored by a particular company, information about the company, company products or services and/or company paraphernalia can be offered. In some embodiments, the content is electronic and can be delivered to the mobile device via wireless or wired channel. In some embodiments, the content is physical content that can be purchased via the mobile device and delivered to or received by a user of the mobile device or otherwise acquired via a physical acquisition of the physical content.

In some embodiments, the criterion comprises a distance between a location of the mobile device and a location of the time-sensitive event. For example, the information to cause the content node device to offer the content can comprise first information to cause a content node device to offer first content to the mobile device at a first price based on a determination that the distance between the location of the mobile device and the location of the time-sensitive event is a first distance. By contrast, the information can comprise second information to cause a content node device to offer the content to the mobile device at a second price based on a determination that the distance between the location of the mobile device and the location of the time-sensitive event is a second distance. For example, a first type of content can be offered while the mobile device is 0.5 mile to the event venue while a second type of content can be offered while the mobile device is inside the event venue.

By way of example, but not limitation, as the mobile device comes into closer proximity to the event, the price can either increase or decrease for the same content. For example, in some embodiments, the price for content can vary depending on supply and demand. The content offered can be a first price that gradually increases as the content is purchased and therefore demand increases and supply decreases. In some embodiments, the price for similar content can differ based on the specific event and the likelihood that attendees will purchase the content at a particular price point.

The determination regarding the specific content to offer can be based on whether the content is likely to be purchased or able to be used at a particular distance from the event venue. For example, while a playlist of songs may be able to be heard easily during playback from the mobile device while the mobile device is 0.5 miles from a concert, once the mobile device is inside the event venue in which the concert is being held, the playback of the playlist may be indiscernible and thus different content able to be consumed visually can be offered to the mobile device.

In some embodiments, the criterion comprises a computation of the time that the determination to offer content is made relative to the time of the time-sensitive event. In various embodiments, the time the determination is made can be prior to the time-sensitive event, during the time-sensitive event or after the time-sensitive event. For example, if the determination to offer content is made after the event, the content should be content that is of interest notwithstanding the event has ended. As one example, content covered during an event can be offered prior to an event to provide a user of a mobile device an opportunity to review the content prior to the event while a refresher/outline document can be offered after the event has ended.

Accordingly, in some embodiments, the content offered via a content node device can be shifted or changed quickly based on the pre-event, during event and post-event time periods. For example, the content node device can make a first content available only inside of a defined time window and/or change the price based on whether the event has ended, has not begun or is in progress.

Accordingly, method 800 can facilitate placement of content in locations for specified time periods that are likely to yield content sales. Exclusive time-based offers can be provided and the use of new metrics for purchasing based on time around events and/or transit to or proximity to the events can be facilitated in one or more embodiments. One or more embodiments can also facilitate content sales by allowing for specified differentiated content that can include event offerings and non-event offerings. The content node devices that can offer content in method 800 can be location mapped with field of coverage against specific routes that foot traffic and, in some embodiments, vehicles, traverse. Second, the content node devices can be mapped against local event locations, retail outlets and, in some embodiments, offered for use to content owners or content sellers of digital content based on the content node device location, popularity of transit routes to one or more different events and/or patterns associated with retail.

Turning back to method 800, in some embodiments, the criterion comprises a point of entry of points of entry within a venue of the time-sensitive event through which the mobile device passes. Based on the point of entry into the venue, a determination can be made, for example, as to the likelihood that a user of the mobile device will purchase content at a particular price point and the content can be offered (or withheld from offer) and/or offered at a particular price point based on the determination. In some embodiments, the point of entry is indicative of a predicted likelihood of interest in a premium type of content. For example, a mobile device entering a theater at a door that leads to premium theater seats can be offered premium products while a mobile device entering a theater at a door that leads to inexpensive balcony seats can be offered non-premium products. Similarly, a mobile device passing through the event venue doorway for seats at home plate can be offered one type of content while mobile devices passing through the event venue doorway for outfield seats can be offered a different type of content.

In some embodiments, the criterion comprises a type of purchase likely to be made by a user associated with the mobile device. In some embodiments, the type of purchase likely to be made by the user is based on a value of a ticket associated with the time-sensitive event and associated with the user. For example, the mobile device can contain mobile device information indicative of a stored electronic ticket or stored electronic information associated with or identifying an electronic ticket for a user of the mobile device to access an event. One or more aspects of the electronic ticket or the electronic information can be received and/or accessed by the content node device or, in some embodiments, a control system (e.g., with reference to FIG. 1, control system 128) providing instructions to the content node device, and/or the aspects received and/or accessed can be utilized to make a determination regarding the likelihood that a user of the mobile device will purchase a particular product and/or purchase a particular product at a particular price. If the determination is made that a satisfactory likelihood exists, the content node device can offer the product to the mobile device and/or offer the product to the mobile device at a particular price.

In some embodiments, the content node device is configured to receive and/or access information indicative of a purchase of the content over a wireless network connecting the content node device and the mobile device. The content node device is also configured to cause the content purchased by the mobile device to be delivered to the mobile device. In some embodiments, the content node device is configured to receive and/or access information indicative of a purchase of the content over a wireless network between the content node device and the mobile device, and cause a physical representation of the content to be available to a user of the mobile device in proximity to the location of the time-sensitive event.

In some embodiments, although not shown, method 800 can also include prior to the determining, deriving route information indicative of a route of one or more different routes over which at least one content node device of the content node devices has a wireless network coverage area. The route information can include one or more courses or streets from one location to a destination. In some embodiments, the destination can be the event venue. In some embodiments, the destination can be a retailer or any area over which the content node device provides coverage (and the mobile device can therefore receive content and/or advertisement and/or acquire content). In some embodiments, the route information can be or include one or more landmarks, an icon indicative of the event and can be described via textual or visual information or direction to a destination. In some embodiments, numerous different routes leading to or in proximity to the event can be determined. The different routes can have one or more different content node devices that have coverage areas that overlap on the one or more of the different routes.

In some embodiments, the mobile device is mobile within the route based on non-automotive traffic. For example, movement of the mobile device is based on a user transporting a mobile device via foot traffic, running/jogging, skate board, bicycle or another non-autonomous mode of transportation.

In some embodiments, the route information is also generated based on the location of the time-sensitive event and an amount of foot traffic along the route. For example, a path, street or area in which a defined amount of foot traffic is predicted or expected to satisfy a defined criterion can be included in the route (and included as part of a premium route along which sellers of content may pay a premium to sell or advertise content via the content node device for the route). By contrast, a path or street or area in which the defined amount of foot traffic is not predicted or expected to satisfy the criterion (be at least a defined value) can be included as part of a non-premium route for which sellers of content may pay less to sell content and/or advertise.

In some embodiments, the content node device can be located at a brick and mortar store offering products other than the content in some embodiments. For example, the content node device can be offered at a STARBUCKS® café in which a user of the mobile device can obtain a cup of coffee from the retailer while obtaining content from the content node device.

In some embodiments, the content node device can be controlled such that different content is offered to allow for differentiated content offerings. For example, the content node device can provide event offerings and non-event offerings. During a particular day/time that is associated with an event (e.g., within a defined amount of time before or after an event or within a defined number of days before or after an event or during an event), the content node device can have a first set of content offerings associated with the event. Outside of the defined day/time that is associated with the event, the same content node device can have a different set of content offerings that are not event-specific and/or may be traffic-specific and directed to the demographic of traffic on the route over which the content node device is providing coverage.

In some embodiments, the traffic-specific content can be based on having a first type of content offered if traffic (e.g., non-automotive traffic) has or is predicted to exceed a defined amount per unit of time while a second type of content can be offered if traffic has or is predicted to exceed a defined amount per unit of time. In some embodiments, a first type of content can be offered for a defined demographic (e.g., age range, income level) of users of the mobile devices providing or expected to provide the traffic on the route covered by the content node device.

Figure 9:
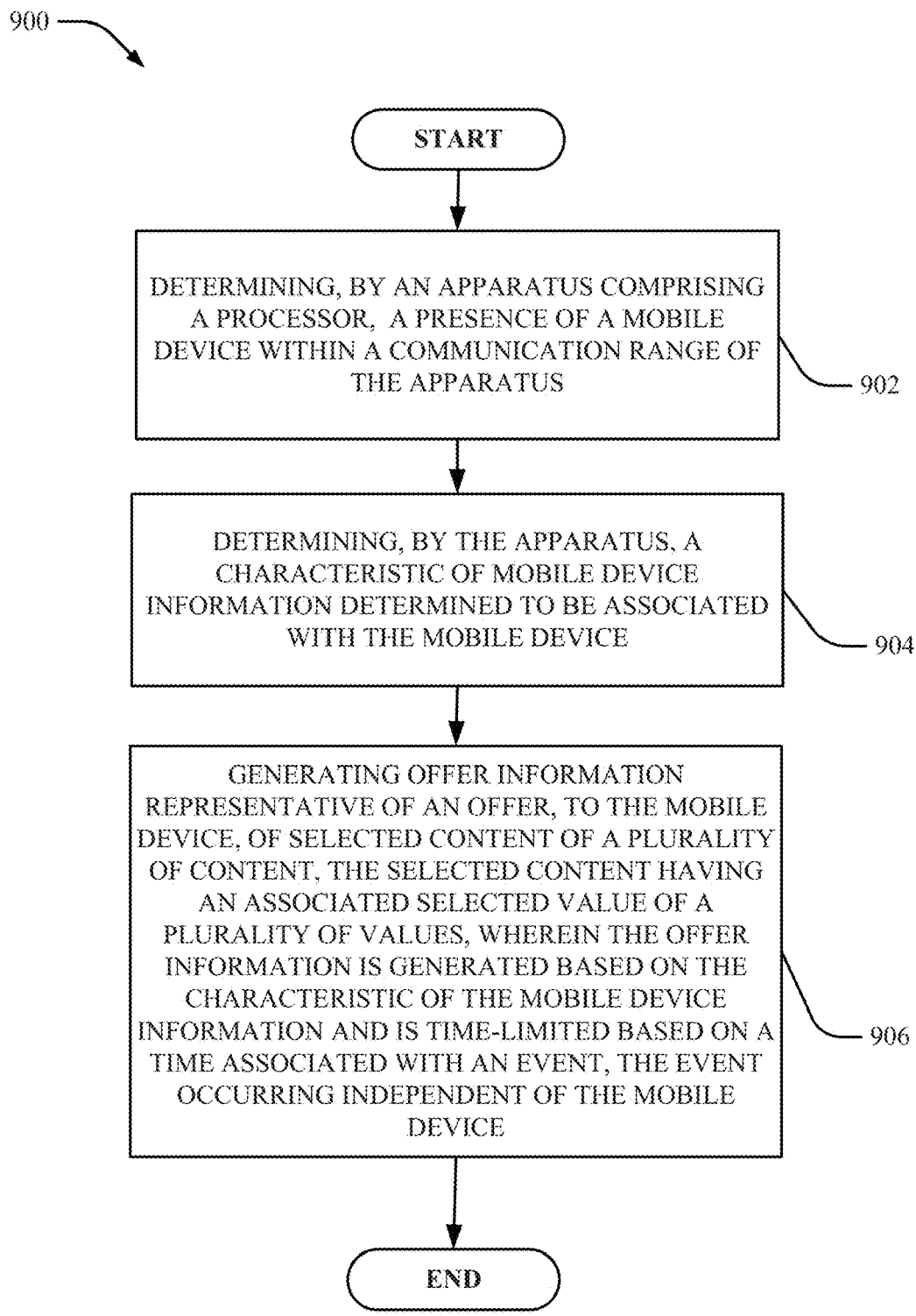

Turning now to FIG. 9, at 902, method 900 can include determining, by an apparatus comprising a processor, a presence of a mobile device within a communication range of the apparatus. For example, the apparatus can be or include one or more of the content node devices 104, 106, 108, 110. The apparatus can detect the presence of the mobile device and/or the apparatus can receive a signal generated by the mobile device or the like. The mobile device can be mobile device 102 in some embodiments.

While not shown, in some embodiments of method 900, the mobile device can scan and detect the presence of the apparatus or an associated signal of the content node device.

In some embodiments, the communication range is determined to overlap with a first route of various possible routes to an event. The first route can be a route that was generated based on a first predicted number of mobile devices determined likely to travel along the first route. In some embodiments, a second route of a number of different routes can be generated based on a second predicted number of mobile devices determined likely to travel along the second route. The first route can be different from the second route in some embodiments, although the first route and the second route can cross and/or overlap at one or more locations along the route.

At 904, method 900 can include determining, by the apparatus, a characteristic of mobile device information determined to be associated with the mobile device. By way of example, but not limitation, the mobile device information can be information (e.g., profile or other information) about a user of the mobile device, information about the location of the mobile device, information about the past history of transactions and/or content purchased via the mobile device or the like. For example, a characteristic can be whether the mobile device information indicates a ticket to a particular event has been purchased via the mobile device and/or the type (e.g., premium or otherwise) of a ticket that has been purchased via the mobile device.

At 906, method 900 can include generating offer information representative of an offer, to the mobile device, of selected content of a plurality of content, the selected content having an associated selected value of a plurality of values, wherein the offer information is generated based on the characteristic of the mobile device information and is time-limited based on a time associated with an event, the event occurring independent of the mobile device. For example, a content offer can be tailored based on the mobile device information (and therefore can be related to the time of event for which the mobile device information indicates a ticket has been purchased) but the offer may expire at a time relative to a time of the event, and the content node device can then forgo offering the content, after the event associated with the content has started and/or ended.

In some embodiments, although not shown in method 900, the method can also include receiving purchase information indicative of a purchase of the selected content via a network device of a wireless network connected to the apparatus and the mobile device. Although also not shown, method 900 can also include causing the selected content to be delivered to the mobile device based on receiving the purchase information.

In some embodiments, the apparatus is located at a brick and mortar store that offers products other than the content. For example, the apparatus can be content node device 104 and can be located at a retailer location (e.g., BURGER KING® restaurant). Accordingly, co-marketing arrangements can be made with adjunct event locations.

Figure 10:
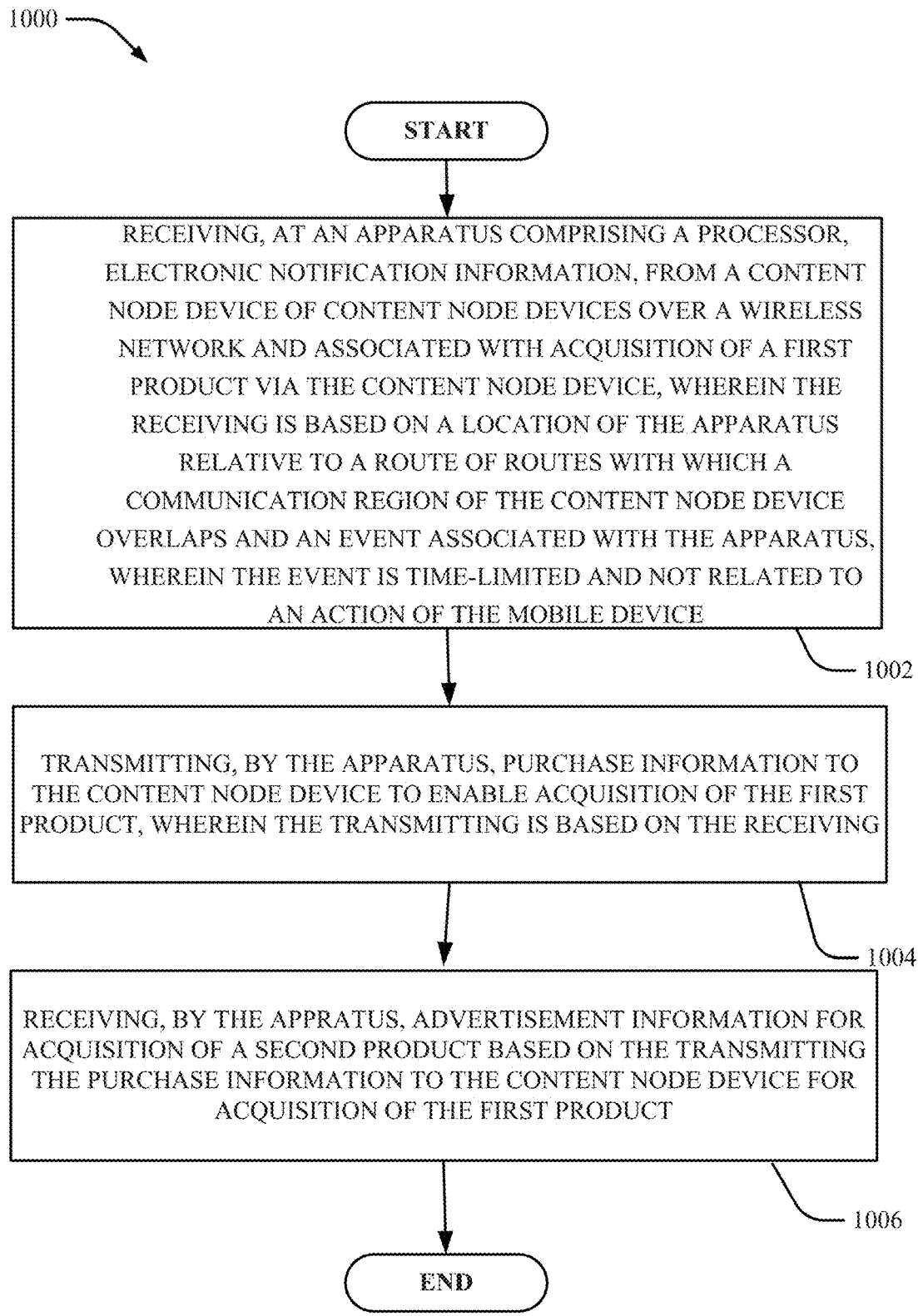

Turning now to FIG. 10, at 1002, method 1000 can include receiving, at an apparatus comprising a processor, electronic notification information, from a content node device of content node devices over a wireless network and associated with acquisition of a first product via the content node device, wherein the event is time-limited and not related to an action of the mobile device. The receiving can be based on a location of the apparatus relative to a route of numerous possible routes with which a communication region of the content node device overlaps and based on an event associated with the apparatus. For example, the content node device can be or include one or more of content node devices 104, 106, 108, 110 and the apparatus can be or include one or more of mobile devices 102, 402.

In this embodiment, the apparatus can receive the electronic notification information (which can be or include an offer for content and/or an advertisement) based on the presence of the mobile device on a particular route and therefore within transmission range of a particular content node device that can then transmit the content offer and/or the advertisement to the apparatus.

At 1004, method 1000 can include transmitting, by the apparatus, purchase information to the content node device to enable acquisition of the first product, wherein the transmitting is based on the receiving. Accordingly, in some embodiments, the mobile device transmits purchase information to the content node device to purchase the content offer and/or to purchase one or more items that can be physical items and/or electronic items in various embodiments.

In some embodiments, the receiving the electronic notification information comprises receiving first electronic notification information based on a time period of the receiving being determined to be prior to the event and the apparatus being determined to be at a first location along the route. In another embodiment, the receiving the electronic notification information can comprise receiving second electronic notification information based on the time period of the receiving being determined to be after the event.

In some embodiments, at 1006, method 1000 can include receiving, by the apparatus, advertisement information for acquisition of a second product based on the transmitting the purchase information to the content node device to enable the acquisition of the first product. Accordingly advertisement can be received for a second product based on a determination that the mobile device has transmitted information for acquisition of the first content.

Figure 11:
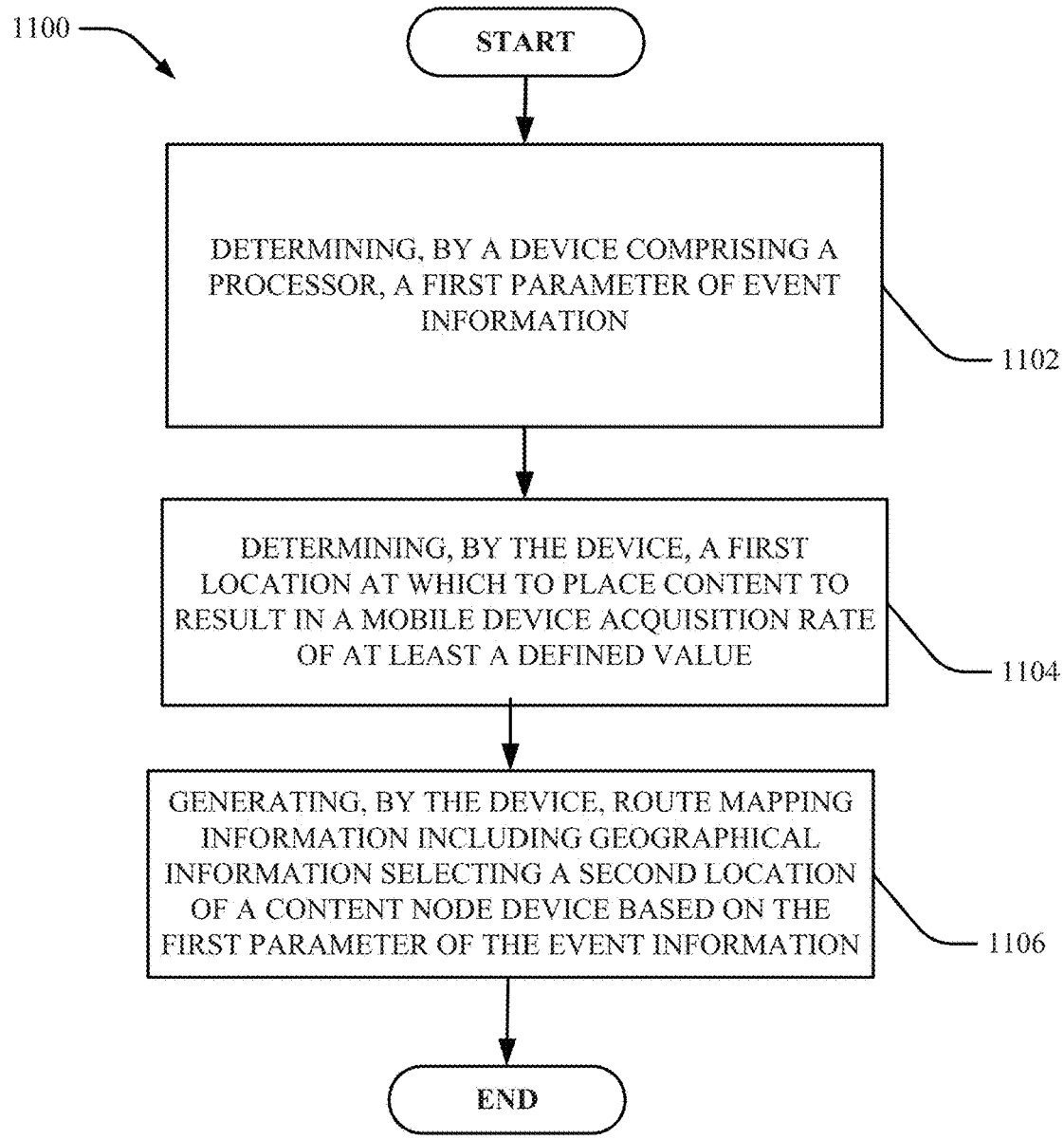

Turning now to FIG. 11, at 1102, method 1100 can include determining, by a device comprising a processor, a first parameter of event information. For example, the device can be or include the control system 128 (or, with reference to the embodiment of FIG. 7, the device can be or include a component of the control system 128). In some embodiments, the first parameter can be the type of the event, the location of the event, the time and/or date of the event or any number of other parameters regarding the event.

At 1104, method 1100 can include determining, by the device, a first location at which to place content to result in a mobile device acquisition rate of at least a defined value. For example, the device can identify numerous different routes to the event and identify locations for content node devices such that one or more (or, in some embodiments, each) of the routes are included in a communication region of a content node device.

At 1106, method 1100 can include generating, by the device, route mapping information including geographical information selecting a second location of a content node device based on the first parameter of the event information. Accordingly, the control system 128 (or a component of the control system 128) can map locations of numerous different content node devices offering content from different locations for a particular event.

In some embodiments, although not shown, method 1100 can also include determining a second parameter for a cost of the content based on the first parameter of the event information and the route mapping information. In some embodiments, although also not shown, method 1100 can include determining a second parameter for a cost of advertisement offered via the content node device based on the route mapping information.

Figure 12:
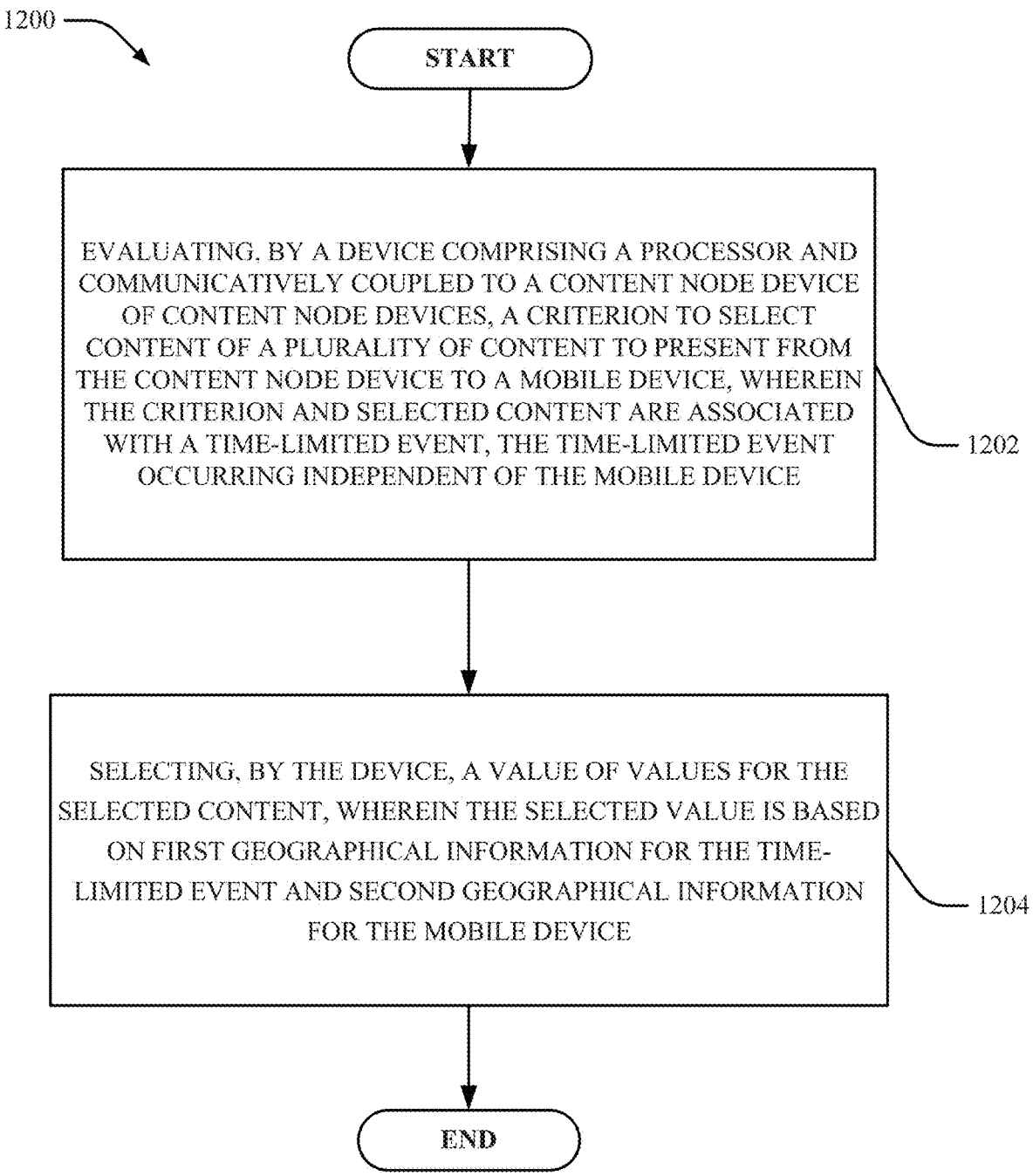

Turning now to FIG. 12, at 1202, method 1200 can include evaluating, by a device comprising a processor and communicatively coupled to a content node device of content node devices, a criterion to select content of a plurality of content to present from the content node device to a mobile device, wherein the criterion and selected content are associated with a time-limited event, the time-limited event occurring independent of the mobile device.

For example, the time-limited event can occur independent of the mobile device such that the movement of the mobile device to a particular location does not affect or result in the occurrence of the time-limited event. As another example, the time-limited event can occur independent of any action or process performed by the mobile device such that the occurrence of the time-limited event is unrelated to any action or process performed by the mobile device. Also, it is to be understood that the terms "event" and "time-limited event" encompass the same scope of protection herein.

In some embodiments, the criterion comprises a determination of whether the time-limited event has commenced prior to the time of the evaluating. In some embodiments, the criterion is based on a likelihood of a defined type of purchase for the time-limited event to be made by a user identity determined to be associated with the mobile device. In some embodiments, the criterion is based on a first time of the evaluating relative to a second time of the time-limited event, and wherein presentation of the selected content to the mobile device is performed based on the first time of the evaluating being determined to be after an end of the time-limited event. In some embodiments, the criterion is based on a predicted likelihood of interest in a type of the selected content, and wherein the predicted likelihood of interest is determined according to a point of entry of points of entry of a venue of the time-limited event through which the mobile device has been determined to have passed.

In some embodiments, the first geographical information and the second geographical information are associated with route information indicative of a selected route of routes over which one of the content node devices has a wireless network coverage area. In some embodiments, the route information is further generated based on a location of the time-limited event and an amount of foot traffic determined along a defined area proximate to the location of the time-limited event. For example, the selected content can be presented to the mobile device in association with different ones of the values along different ones of the routes to the location of the time-limited event.

In some embodiments, the selected value for the content is based on a ticket associated with the time-limited event and associated with a user identity for the mobile device.

At 1204, method 1200 can include selecting, by the device, a value of values for the selected content, wherein the selected value is based on first geographical information for the time-limited event and second geographical information for the mobile device.

Although not shown, in some embodiments, the method 1200 can include generating, by the device, information to cause the content node device of the content node devices to present, to the mobile device, the selected content with the selected value, wherein the generating is based on the evaluating and the selecting.

Although also not shown, in some embodiments, the method 1200 can include, prior to the evaluating, generating, by the device, route information indicative of a route of routes over which one of the content node devices has a wireless network coverage area.

Figure 13:
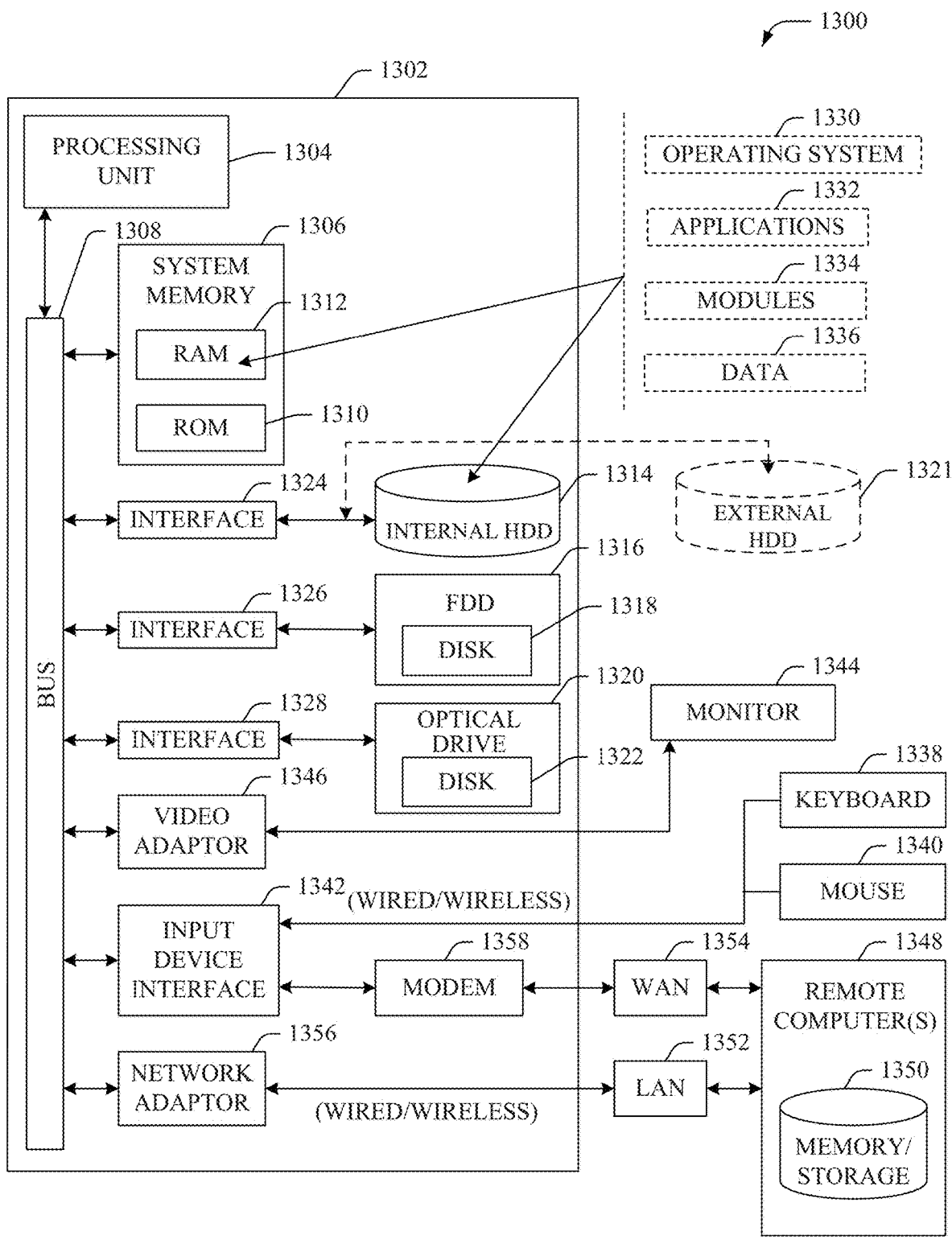
FIG. 13 illustrates a block diagram of a computer that can be employed in accordance with one or more embodiments.

FIG. 13 illustrates a block diagram of a computer that can be employed in accordance with one or more embodiments. Repetitive description of like elements employed in other embodiments described herein is omitted for sake of brevity.

In some embodiments, the computer can be or be included within any number of components described herein comprising, but not limited to, content node devices 104, 106, 108, 110, mobile device 102 and/or control system 128 (or a component of content node devices 104, 106, 108, 110, mobile device 102 and/or control system 128).

In order to provide additional text for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable (or machine-readable) storage media and/or communications media, which two terms are used herein differently from one another as follows. Computer-readable (or machine-readable) storage media can be any available storage media that can be accessed by the computer (or a machine, device or apparatus) and includes both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multiprocessor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1310 (e.g., EIDE, SATA), which internal hard disk drive 1314 can also be configured for external use in a suitable chassis (not shown), a magnetic floppy disk drive 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface, respectively. The interface 1324 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1302, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A communication device can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless AP disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=$confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable (or machine-readable) storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   evaluating, by a device comprising a processor and communicatively coupled to a content node device of content node devices, a criterion to select content of a group of content to present from the content node device to a mobile device of mobile devices, resulting in selected content, wherein the criterion and the selected content are associated with a time-limited event;
   selecting, by the device, a value of values for the selected content;
   pricing, by the device, bundles of the selected content with a product associated with the time-limited event, wherein the pricing comprises setting a first price for a first one of the bundles based on a first time window during which the first one of the bundles is offered and an inventory of the product and setting a second price for a second one of the bundles based on a second time window during which the second one of the bundles is offered and the inventory of the product; and
   facilitating, by the device, content provisioning of selected ones of the mobile devices that are determined to have traversed a defined route via non-automotive traffic, wherein the route comprises a defined pathway to a destination.

2. The method of claim 1, wherein the product comprises a service, and further comprising:
   generating, by the device, information to cause the content node device of the content node devices to present, to the mobile device, the selected content with the selected value, wherein the generating is based on the evaluating and the selecting.

3. The method of claim 1, wherein the criterion comprises a determination of whether the time-limited event has commenced prior to a time of the evaluating.

4. The method of claim 1, wherein the first geographical information and the second geographical information are associated with route information indicative of a selected route of routes over which one of the content node devices has a wireless network coverage area.

5. The method of claim 1, wherein the criterion is based on a likelihood of a defined type of purchase for the time-limited event to be attributed to a user identity determined to be associated with the mobile device.

6. The method of claim 1, wherein the criterion is based on a first time of the evaluating relative to a second time of the time-limited event, and wherein presentation of the selected content to the mobile device is performed based on the first time of the evaluating being determined to be after an end of the time-limited event.

7. The method of claim 1, wherein the criterion is based on a predicted likelihood of interest in a type of the selected content, and wherein the predicted likelihood of interest is determined according to a point of entry of points of entry of a venue of the time-limited event through which the mobile device has been determined to have passed.

8. The method of claim 1, wherein the selected value is based on a ticket associated with the time-limited event and associated with a user identity for the mobile device.

9. The method of claim 1, further comprising:
   prior to the evaluating, generating, by the device, route information indicative of a route of routes over which one of the content node devices has a wireless network coverage area.

10. The method of claim 9, wherein the route information is further generated based on a location of the time-limited event and an amount of foot traffic determined along a defined area proximate to the location of the time-limited event.

11. The method of claim 10, wherein the selected content is presented to the mobile device in association with different ones of the values along different ones of the routes to the location of the time-limited event.

12. An apparatus, comprising:
a processor; and
a memory that stores executable instructions that, when executed by the processor, facilitate performance of operations, comprising:
  determining a presence of a mobile device within a communication range of the apparatus;
  determining a characteristic of mobile device information determined to be associated with the mobile device;
  generating first offer information representative of a first offer, to the mobile device, of selected content of a group of content, the selected content having an associated selected value of a group of values, wherein the offer information is generated based on the characteristic of the mobile device information and is time-limited based on a first time associated with an event;
  determining a defined price for the selected content, wherein the selected content comprises physical content; and
  reserving the physical content for procurement during a configurable offer time frame limited by the first time associated with the event; and
  sending second offer information representative of a second offer to a device associated with a seller of the selected content, the second offer being an opportunity to sell the selected content, via a selected content node device, at the defined price.

13. The apparatus of claim 12, wherein the procurement is performed inside a venue at which the event occurs or at a vendor location within a defined distance from the venue at which the event occurs, and wherein the communication range overlaps with a first route of routes to the event, and wherein the first route is generated based on a first predicted number of mobile devices determined likely to travel along the first route.

14. The apparatus of claim 13, wherein a second route of the routes is generated based on a second predicted number of mobile devices determined likely to be travel along the second route, and wherein the first route is different from the second route.

15. The apparatus of claim 12, wherein the operations further comprise:
  receiving purchase information indicative of a purchase of the selected content via a network device of a wireless network connected to the apparatus and the mobile device; and
  causing the selected content to be delivered to the mobile device.

16. The apparatus of claim 12, wherein the apparatus is located at a brick and mortar store that offers products other than the selected content.

17. An apparatus, comprising:
a processor; and
a memory that stores executable instructions that, when executed by the processor, facilitate performance of operations, comprising:
  receiving electronic notification information, from a content node device of content node devices of a wireless network and associated with acquisition of a first product via the content node device, wherein the receiving is based on a location of the apparatus relative to a route of routes with which a communication region of the content node device overlaps, a predicted likelihood of interest determined according to a point of entry of points of entry of a venue of a time-limited event through which the mobile device has been determined to have passed, and an event associated with the apparatus and wherein the first product is a physical product;
  receiving pricing for the first product, wherein the pricing is first pricing based on remaining inventory of the first product and a time at which the first product is offered being determined to be in a first time window and the pricing is second pricing based on the remaining inventory of the first product and the time at which the first product is offered being determined to be in a second time window, wherein the first time window and the second time window are non-overlapping, and wherein the first pricing is not the second pricing; and
  transmitting purchase information to the content node device to enable acquisition of the first product, wherein the transmitting is based on the receiving, and wherein mobility of the apparatus is based on foot traffic.

18. The apparatus of claim 17, wherein the apparatus is mobile within the route.

19. The apparatus of claim 17, wherein the operations further comprise: receiving advertisement information for acquisition of a second product based on the transmitting the purchase information to the content node device to enable the acquisition of the first product.

* * * * *